(12) United States Patent
McKnight

(10) Patent No.: US 6,225,991 B1
(45) Date of Patent: May 1, 2001

(54) PIXEL BUFFER CIRCUITS FOR IMPLEMENTING IMPROVED METHODS OF DISPLAYING GREY-SCALE OR COLOR IMAGES

(75) Inventor: Douglas J. McKnight, Boulder, CO (US)

(73) Assignee: The Regents of the University of Colorado, Boulder, CO (US)

( * ) Notice: Subject to any disclaimer, the term of this patent is extended or adjusted under 35 U.S.C. 154(b) by 0 days.

(21) Appl. No.: 09/209,241

(22) Filed: Dec. 10, 1998

Related U.S. Application Data

(60) Division of application No. 08/605,999, filed on Feb. 9, 1996, now Pat. No. 5,959,598, which is a continuation-in-part of application No. 08/505,654, filed on Jul. 20, 1995, now Pat. No. 5,767,828.

(51) Int. Cl.[7] .................................................. G09G 5/00
(52) U.S. Cl. .......................... 345/205; 345/90; 345/213
(58) Field of Search .................................. 345/87, 88, 90, 345/92, 98, 213, 205, 208, 186, 99

(56) References Cited

U.S. PATENT DOCUMENTS

| | | | |
|---|---|---|---|
| H1320 | 6/1994 | Kieronski | 359/48 |
| 4,090,219 | 5/1978 | Ernstoff et al. | 358/59 |
| 4,432,610 | 2/1984 | Kobayashi et al. | 350/331 |
| 4,451,825 | 5/1984 | Hall et al. | 340/750 |
| 4,769,639 | 9/1988 | Kawamura et al. | 340/784 |
| 4,808,991 | 2/1989 | Tachiuchi et al. | 340/793 |
| 4,843,381 | 6/1989 | Baron | 340/784 |
| 4,870,396 | 9/1989 | Shields | 340/719 |
| 4,921,334 | 5/1990 | Akodes | 350/333 |
| 5,012,228 | 4/1991 | Masuda et al. | 340/702 |
| 5,023,718 | 6/1991 | Soloff | 348/715 |
| 5,068,649 | 11/1991 | Garrett | 340/793 |
| 5,077,553 | 12/1991 | Buzak | 340/794 |

(List continued on next page.)

FOREIGN PATENT DOCUMENTS

| | | | |
|---|---|---|---|
| 0 444 962 A2 | 1/1991 | (EP) | G09G/3/28 |
| 0 662 773 A1 | 5/1995 | (EP) | H04N/9/31 |
| 0 797 182 | 9/1997 | (EP) . | |

OTHER PUBLICATIONS

Mercier B. et all, "A New Video Storage Architecture for Plasma Display Panels", IEEE Transactions on Consumer Electronics, vol. 42, No. 1, Feb. 1, 1996, pp. 122–127.

Radcliffe, S., et al. "Miniature Silicon Backplane Ferroelectric Liquid Crystal Display For Head Mounted Display Applications," *Ferroelectrics*, vol. 179, pp. 115–119, 1996.

*Primary Examiner*—Bipin Shalwala
*Assistant Examiner*—Kent Chang
(74) *Attorney, Agent, or Firm*—Fleshner & Kim, LLP

(57) ABSTRACT

A device such as a display device or a spatial light modulator can store pixel data in a plurality of small circuits coupled to pixel mirrors and simultaneously drive these pixel mirrors a frame at a time. This device is particularly beneficial for implementing improved image quality techniques which can convert binary images to grey-scale images and/or separate red, green and blue images into color images and displaying those images using the natural process of integration which occurs when a person views images at sufficiently high rates.

23 Claims, 23 Drawing Sheets

U.S. PATENT DOCUMENTS

| | | | |
|---|---|---|---|
| 5,081,450 | 1/1992 | Lucas et al. | 345/202 |
| 5,093,652 | 3/1992 | Bull et al. | 340/701 |
| 5,122,783 | 6/1992 | Bassetti, Jr. | 340/701 |
| 5,122,784 | 6/1992 | Canova | 345/155 |
| 5,122,791 | 6/1992 | Gibbons et al. | 340/784 |
| 5,126,865 | 6/1992 | Sarma | 359/59 |
| 5,128,782 | 7/1992 | Wood | 309/48 |
| 5,172,108 | 12/1992 | Wakabayashi et al. | 340/793 |
| 5,185,602 | 2/1993 | Bassetti, Jr. et al. | 340/793 |
| 5,194,974 | 3/1993 | Hamada et al. | 359/59 |
| 5,204,659 | 4/1993 | Sarma | 340/784 |
| 5,206,629 | 4/1993 | DeMond et al. | 340/719 |
| 5,214,420 | 5/1993 | Thompson et al. | 340/795 |
| 5,216,414 * | 6/1993 | Fukutani et al. | 345/88 |
| 5,225,823 | 7/1993 | Kanaly | 340/793 |
| 5,245,450 | 9/1993 | Ukai et al. | 359/79 |
| 5,278,652 | 1/1994 | Urbanas et al. | 358/160 |
| 5,313,224 | 5/1994 | Singhal et al. | 345/89 |
| 5,325,106 | 6/1994 | Bahraman | 345/56 |
| 5,341,153 * | 8/1994 | Benzschawel et al. | 345/152 |
| 5,349,366 | 9/1994 | Yamazaki et al. | 345/92 |
| 5,396,261 | 3/1995 | Hastings, III | 345/92 |
| 5,448,258 * | 9/1995 | Edwards | 345/90 |
| 5,459,495 | 10/1995 | Scheffer et al. | 345/147 |
| 5,469,190 | 11/1995 | Masterson | 345/155 |
| 5,471,225 * | 11/1995 | Parks | 345/98 |
| 5,476,146 | 12/1995 | Huang et al. | 348/743 |
| 5,488,387 | 1/1996 | Maeda et al. | 345/89 |
| 5,506,597 | 4/1996 | Thompson et al. | 345/85 |
| 5,506,598 | 4/1996 | Shimada et al. | 345/92 |
| 5,521,727 | 5/1996 | Inaba et al. | 359/56 |
| 5,528,262 | 6/1996 | McDowall et al. | 345/151 |
| 5,534,884 | 7/1996 | Mase et al. | 345/87 |
| 5,537,128 | 7/1996 | Keene et al. | 345/89 |
| 5,566,010 | 10/1996 | Ishii et al. | 358/59 |
| 5,581,273 | 12/1996 | Yoneda et al. | 345/90 |
| 5,583,534 | 12/1996 | Katakura et al. | 345/97 |
| 5,627,557 * | 5/1997 | Yamaguchi et al. | 345/90 |
| 5,666,130 * | 9/1997 | Williams et al. | 345/90 |
| 5,717,418 * | 2/1998 | Shapiro et al. | 345/89 |
| 5,777,591 | 7/1998 | Katoh et al. | 345/92 |
| 5,790,213 | 9/1998 | Sasaki et al. | 349/48 |
| 5,844,538 | 12/1998 | Shiraki et al. | 345/98 |
| 5,926,158 * | 7/1999 | Yoneda et al. | 345/90 |

* cited by examiner

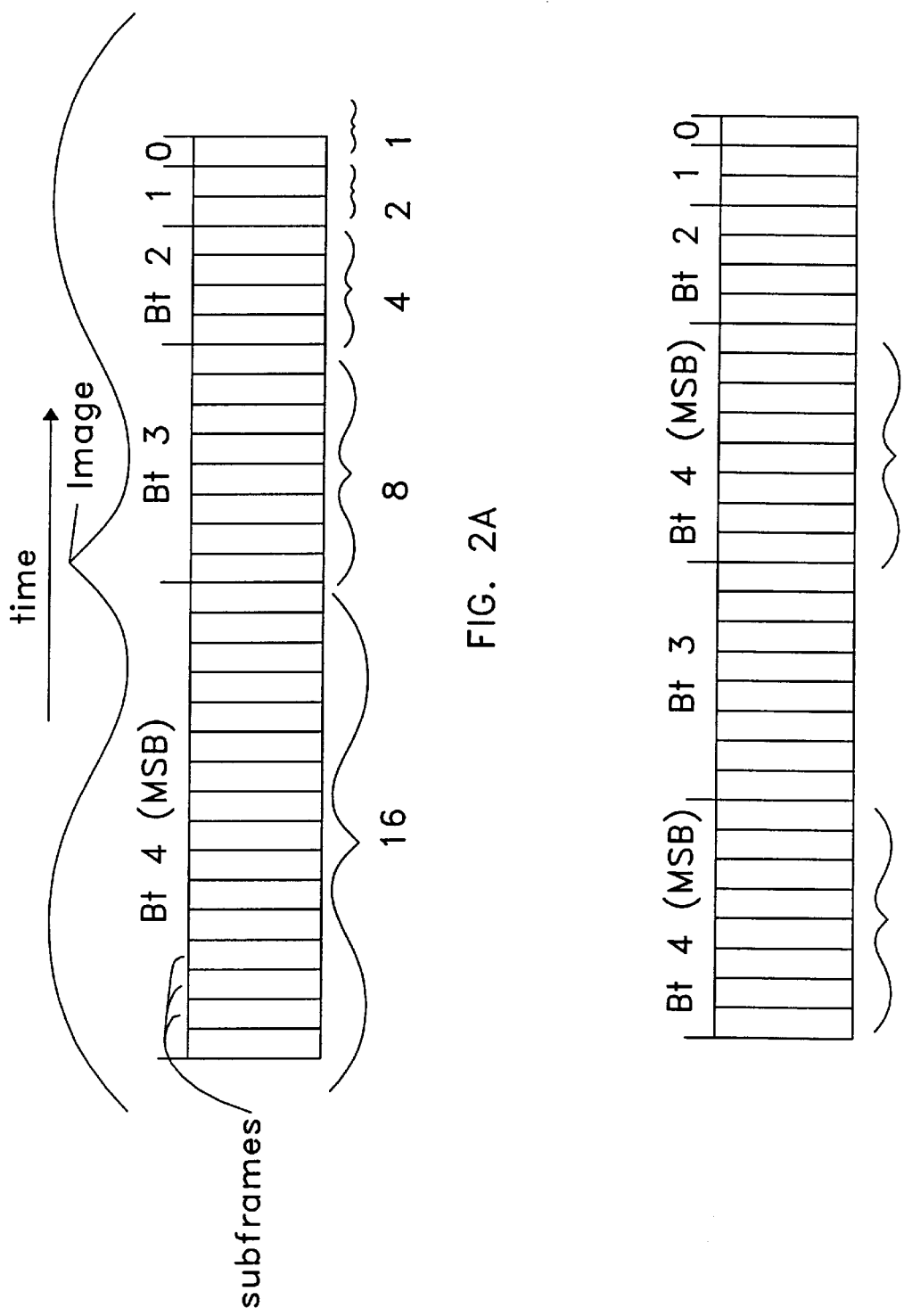

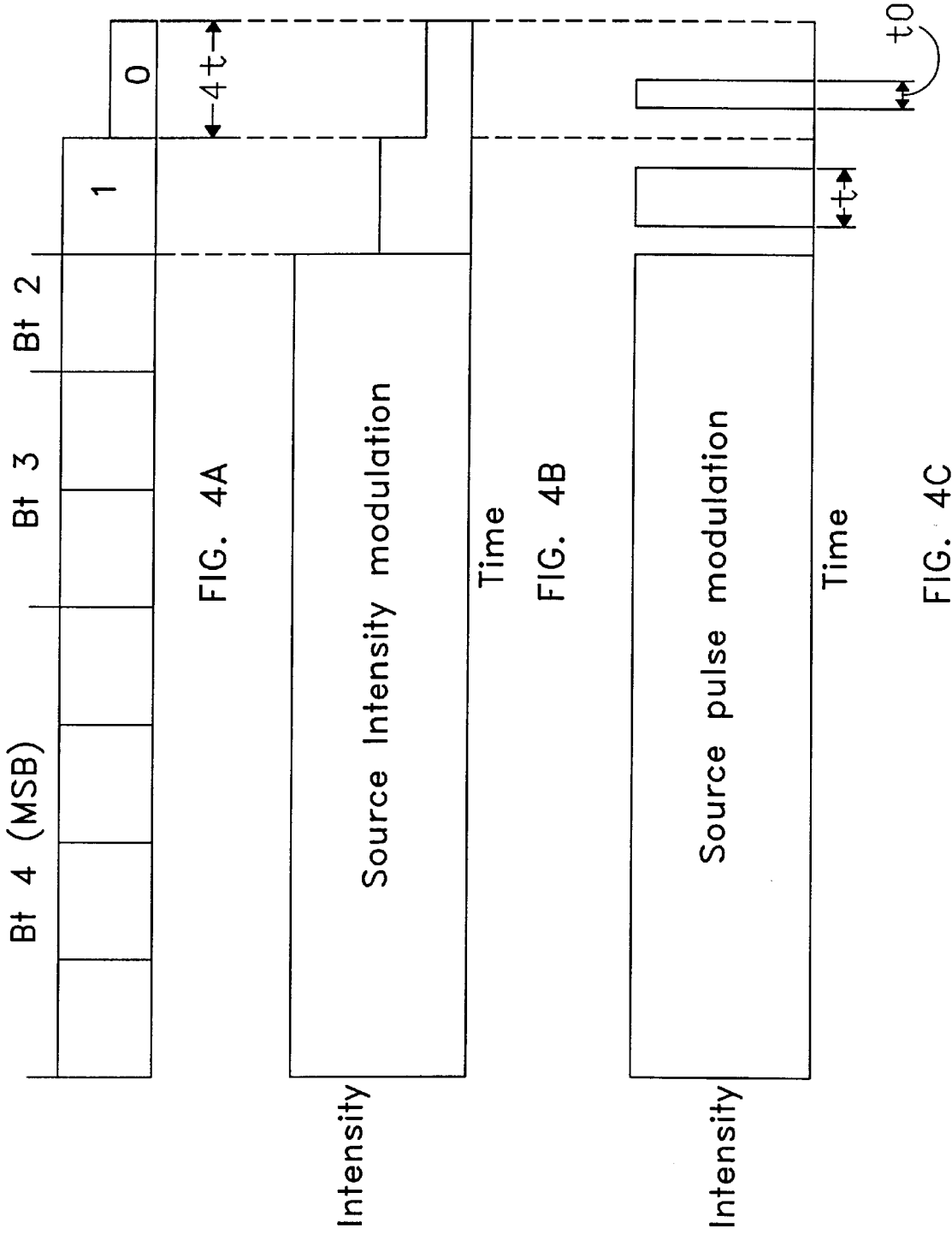

PIXEL BUFFER CIRCUITS FOR IMPLEMENTING IMPROVED METHODS OF DISPLAYING GREY-SCALE OR COLOR IMAGES

This application is a Divisional of application Ser. No. 08/605,999, filed Feb. 9, 1996, now U.S. Pat. No. 5,959,598, which in turn is a Continuation In-Part of application Ser. No. 08/505,654, filed Jul. 20, 1995, now issued as U.S. Pat. No. 5,767,828. The contents of both applications are hereby incorporated by reference.

BACKGROUND OF THE INVENTION

1. Field of the Invention

This invention relates generally to an apparatus and method for improving image quality and in particular to an apparatus and method for converting binary images to grey-scale or coler images and for converting a series of red, green, and blue analog images to coler, images, and then either displaying those images or driving a spatial light modulator.

More specifically, this invention relates to binary and analog frame buffer pixel devices and to frame buffer type devices and methods for implementing improved methods of displaying images or of driving spatial light modulators.

2. Background of the Related Art

It has been known that when a person views a rapidly cycled through sequence of binary images, the person may, if the rate and duration of images is proper, temporally integrate such that that sequence of binary images and the sequence in turn appears to be grey-scale images. This integration phenomenon is of particular interest with the arrival of high speed binary displays. Such devices are used, for example, in projection display systems, head-up displays and head mounted displays. There exist small fast high resolution displays which are essentially binary in nature such as the Digital Mirror Device (DMD), made by Texas Instruments, active matrix electro-luminescence (AMEL) field emission display (FED) as well as actively addressed ferro-electric liquid crystal devices. These technologies are capable of producing many thousands of binary images per second, depending on the number of pixels per frame, etc. . . .

FIG. 1A shows a series of binary images 105 which could be viewed by a person in the manner described above. Each frame F1-Fm will be comprised of a series of bits that are either 1 (ON) or 0 (OFF). That is, the series F1–Fm of frames as well as each individual frame is actually a series of bits which must eventually be displayed in order to make it possible for the person viewing the binary images to perform the integration discussed above. FIG. 1A further shows pixels Pj in general, and P1–P4, in particular, as representative pixels. As each frame F1–Fm is displayed for a time t, some of the pixels Pj will be a logical 1 and some will be a logical 0. In order for a person to view images produced by frames F1–Fm, a display device is required.

A problem with the above approach is that a display device which displays the group of binary images 105 must be capable of responding in the time t (which relates to the frame rate 1/t). This places a limitation on which displays can be used. Namely, only those display devices can be used which have response rates at least as great as 1/t Hz or frames per second. However, the integration process requires that t be small, otherwise the display would appear to flicker and not appear to provide a grey-scale.

Currently, there are a variety of display devices which might be used to output the above discussed subframes. Liquid crystal on silicon (LCOS) devices which have been designed as displays (or spatial light modulators) have used pixel designs which can be categorized as being either "dynamic" or "static". A static pixel design has a memory element at each pixel, which can store the pixel data indefinitely without the need for periodic refresh cycles. This is analogous to SRAM (static random access memory) in computer memory. A dynamic pixel stores data capacitively and requires a periodic refresh to compensate for leakage of the stored charge, analogous to DRAM (dynamic random access memory).

Both of these types of displays share the property that as the array of pixels is addressed in sequence, row-at-a-time, the liquid crystal begins to update to the new data immediately once the row is addresses. It happens that a reasonably high resolution displays, such as 1024 pixels, the electronic refresh time is comparable or longer than the liquid crystal switching time. For example, if data is supplied to the display through 32 data wires running at 50 M bits/sec, such an array of pixels takes approximately 690 microseconds to update. The liquid crystal switches in approximately 100 microseconds. It is valid, therefore, to view the display as being updated in a sweeping motion across its area.

In some applications, it would be advantageous to have the data on all of the display be simultaneously valid before it can be usefully viewed. Examples of such applications include most coherent applications such as optical correlators, optical precise steerers etc. . . , and display applications where precise synchronization with other parts of the system, such as an illuminated source, is required.

Current pixel designs using liquid crystal displays or microdisplays fall into two major categories, namely, single transistor pixel systems and static pixel systems. There are a number of variations to these types of designs, but all relate generally to one of these two approaches.

FIG. 1B shows a schematic of a single transistor pixel circuit 701 which is part of conventional single transistor pixel array system. Such systems are used in the so-called active matrix type computer screens as well as in some silicon, backplane microdisplays which use liquid crystal displays. The entire array of pixels is formed such that all of the pixels circuits 701 in a row of the display share a gate wire 705 and all of the pixel circuits in a column share a data wire 710 (or vice versa). Each pixel circuit 701 includes a transistor 714 and a pixel mirror or window electrode 718.

Displays using circuit 701 are updated a row-at-a-time. In particular, gate wire 705 is activated, thereby activating all transistors 714 on a single row of pixels on the display. Upon activation of gate wire 705, charge flows through transistor 714, thereby bringing the pixel mirror 718 to the same voltage as data wire 710. Device 718 can be a pixel mirror, electrode window, or pixel electrode and hence these will be used interchangeably throughout this specification. Gate wire 705 is then de-activated, thereby trapping the charge and hence the voltage on pixel mirror 718. The voltage on pixel mirror 718 then switches the liquid crystal (not shown). There is a capacitance associated with pixel mirror 718 and the details of the design of such a pixel often deal with maximizing this capacitance to improve charge storage.

Pixel circuit 701 can be used either as an analog pixel, when the voltages on data wires 710 are driven to intermediate values, or as a binary pixel when these wires are driven to only two values—typically 0 V and 5 V. It must be noted, however, that this pixel display approach is not a frame-buffer pixel as called for in the parent application to this application. That is, the pixel mirrors 718 are updated a row-at-a-time.

The other type of pixel design that has been used is the so-called static pixel displays. Static pixel displays use pixels which contain a data-latch and possibly other circuitry. This approach has been used, for example, by a research group at the University of Edinburgh in Scotland. FIG. 1C shows a schematic of a static pixel circuit 721 referred to as a SRAM pixel. Pixel circuit 721 includes a data latch 732 connected to array gate wire 705 and data wire 710. Pixel circuit 721 also has a pixel mirror or electrode window 718. (Note that gate wire 705 and data wire 710 are given the same reference numbers in FIG. 1C as they had in FIG. 1B.) Here, however, data latch 732 reads the logic level on data wire 710 under the control of gate wire 705. A data bit is stored in data latch 732 in the conventional manner that static latches store data and hence, the data is stored indefinitely without refresh. Output 740 of data latch 732 can be directly connected to pixel mirror 718 or connected to an exclusive-or (X-OR) 750 (as shown) or an exclusive-nor (X-NOR) gate (not shown). Exclusive-or 750 (or the X-NOR) drive a pixel clock (not shown) either in-phase or out-of-phase with a global clock line 755 from a global clock (not shown.

X-OR 750 functions in accordance with the signal 740 output from data latch 732, and consequently functions in accordance with the data bit stored in latch 732. For example, all pixels in the static display device that have a "1" stored in latch 732 take the opposite logic value of global clock signal 755, whereas all pixels in the static display device that have a "0" stored in latch 732 take the same logic value as the global clock signal 755. This was originally done to facilitate d.c. balancing of nematic liquid crystals used in earlier liquid crystal on silicon devices. It has been retained by the Edinburgh group in some of their fast ferroelectric devices to assist with frame-inversion, which is another form of d.c. balancing used with FLC based devices. Hence, once these displays load a frame of data, they have the inverse of that frame available at the pixel mirrors simply by switching the global clock.

This pixel display approach is also not a frame-buffer pixel as called for in the parent application to this application. That is, although the image data are stored on the pixel array, the pixel latches 73 (and hence the pixel mirrors 718) are updated a row-at-a-time, just as in the single transistor case discussed above. Note that this pixel display approach is binary since latch 732 uses restoring logic to pull all nodes in the circuit to either a logic "1" or a logic "0" as does X-OR gate 750.

SUMMARY OF THE INVENTION

Therefore, an object of the invention is to provide a display device which can provide improved image quality from binary or analog display devices by updating images a frame at a time.

Another object of the invention is to provide a display apparatus that can integrate entire frames of information together before displaying that information.

Another object of the invention is to provide an apparatus for achieving grey-scale images produced using binary display devices.

Another object of the invention is to provide an apparatus with one or more data storage locations at each pixel location.

Another object of the invention is that it includes pixel circuitry that can be arranged in a small area about the pixel.

Another object of the invention is to provide an apparatus capable of providing an analog signal or binary signal at each pixel.

Another object of the invention is to provide an apparatus for dynamically displaying an image or an apparatus for statically displaying an image.

One advantage of the invention is that it makes it possible to observe grey-scale images using a binary display device.

Another advantage of the invention is that it significantly reduces the time interval during which the displayed data is changing by avoiding the row by row updating of the pixels.

Another advantage of the invention is that it can be used to produce colored grey-scale images.

Another advantage of the invention is that it can utilize liquid crystal display devices.

Another advantage of the invention is that it can be used with static as well as dynamic type display systems.

One feature of one embodiment of the invention is that it utilizes inverters to drive pixel electrodes in one embodiment.

Another feature of an embodiment of the invention is that it utilizes capacitors to store information.

Another feature of the invention is that it can drive the pixel electrodes with an analog or binary voltage.

Another feature of the invention is that it utilizes only n-FET transistors in one embodiment.

Another feature of the invention is that in one embodiment the ON pixels in the least significant frame is displayed at approximately half their full duration but no change in their output or ON intensity.

Another feature is that the non-attenuated subframes are grouped together to reduce the rate at which the display device outputs subframes.

Another feature on an embodiment of the invention is that the ON pixels in the least significant frame is displayed at approximately half their full or ON intensity.

Another feature of the invention is that is can utilize pixel buffers or a frame/image buffer.

These and other objects advantages and features are achieved by the provision of a device comprising: a substrate having a first surface; a plurality of driving electrodes arranged on the first surface of the substrate; and a plurality of means arranged on the substrate and respectively coupled to the plurality of driving electrodes, for receiving image data comprised of a series of subframes and driving the plurality of driving electrodes in accordance with a switching signal.

The above and other objects, advantages and features are further achieved when each of the above plurality of means comprises: a first switch coupled to a gate signal and a data line for receiving a pixel datum of the image data and outputting the pixel datum in accordance with the gate signal; a first inverter coupled to the first switch for receiving the pixel datum; a second switch coupled to a clock signal and the first inverter; and a second inverter coupled to the switch and to a respective one of the plurality of driving electrodes, wherein the pixel datum is transmitted from the first inverter to the second inverter in accordance with the clock signal, and outputs the pixel datum to said respective one of the plurality of driving electrodes.

The above and other objects, advantages and features are further achieved when each of the above plurality of means comprises: a first switch coupled to a gate signal and a data line for receiving a pixel datum of the data and outputting the pixel datum in accordance with the gate signal; a capacitance means coupled to the first switch for receiving and store the pixel datum; a second switch coupled to a clock signal and the capacitance means; and an inverter coupled to the switch and to a respective one of the plurality of driving electrodes, wherein the pixel data is transmitted from the capacitor means to the inverter in accordance with the clock signal, and which outputs the pixel data to the respective one of the plurality of driving electrodes.

BRIEF DESCRIPTION OF THE DRAWINGS

FIG. 2A demonstrates how subframes (such as bit plane binary subframes) can be displayed in different order within a group of subframes, some being advantageous over others in various situations. FIG. 2B shows how the most significant bit frames can be distributed or spread through the entire group of frames.

FIGS. 4A, 4B and 4C show another approach achieve a grey-scale effect for the case where m'=2 (corresponding to FIG. 3C) with a frame rate of approximately 1/(4t).

DETAILED DESCRIPTION OF PREFERRED EMBODIMENTS

Several embodiments of frame-buffer type devices will be discussed. First, however, methods and apparatii for displaying grey-scale or color images using such frame-buffer type devices will be discussed with reference to FIGS. 1–5. Then a general buffer type display device will be presented in FIGS. 6A and 6B which takes advantage of the integration methods discussed with reference to FIGS. 1–5. Specific embodiments for binary or analog buffered displays will then be presented in FIGS. 7 through 9, some of which are dynamic (active) type displays, and some of which are static type displays.

Figure 1A:
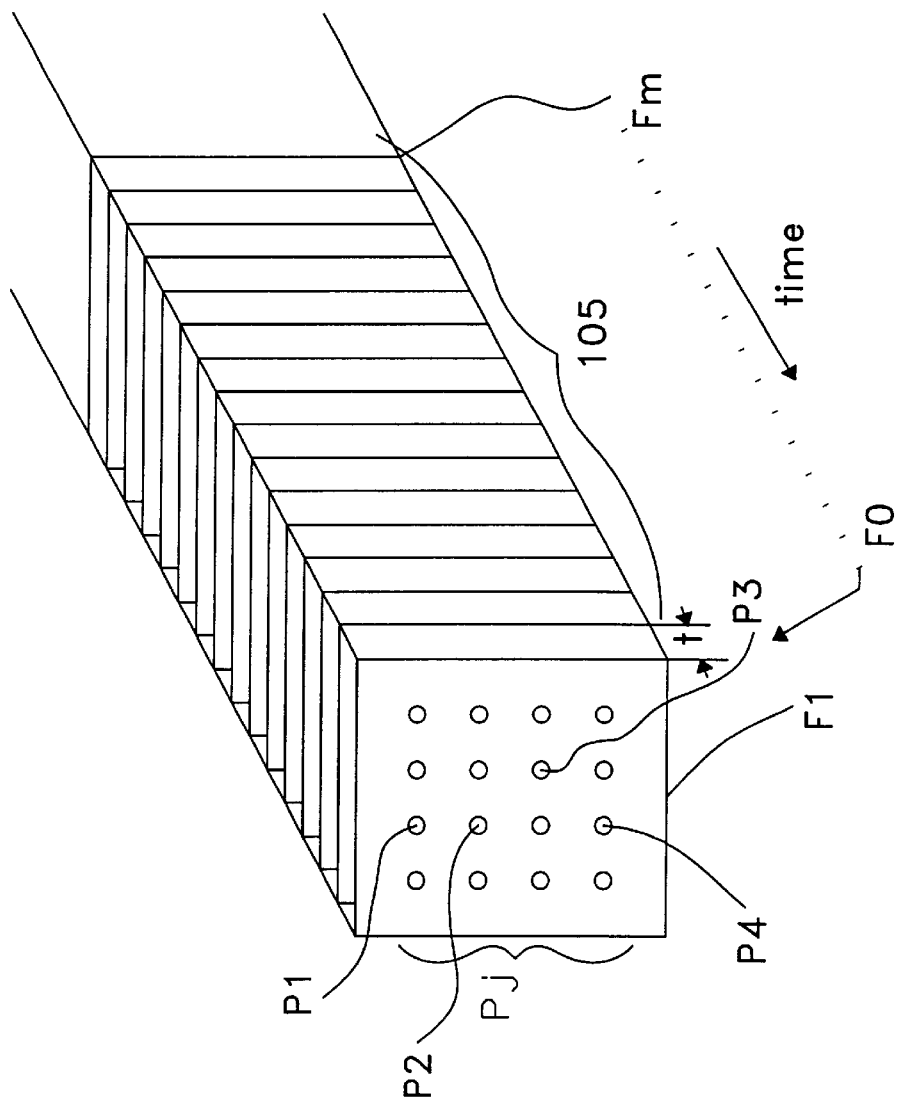
FIG. 1A shows a series of binary images which could be viewed by a person in the manner described above.
Figure 1B:
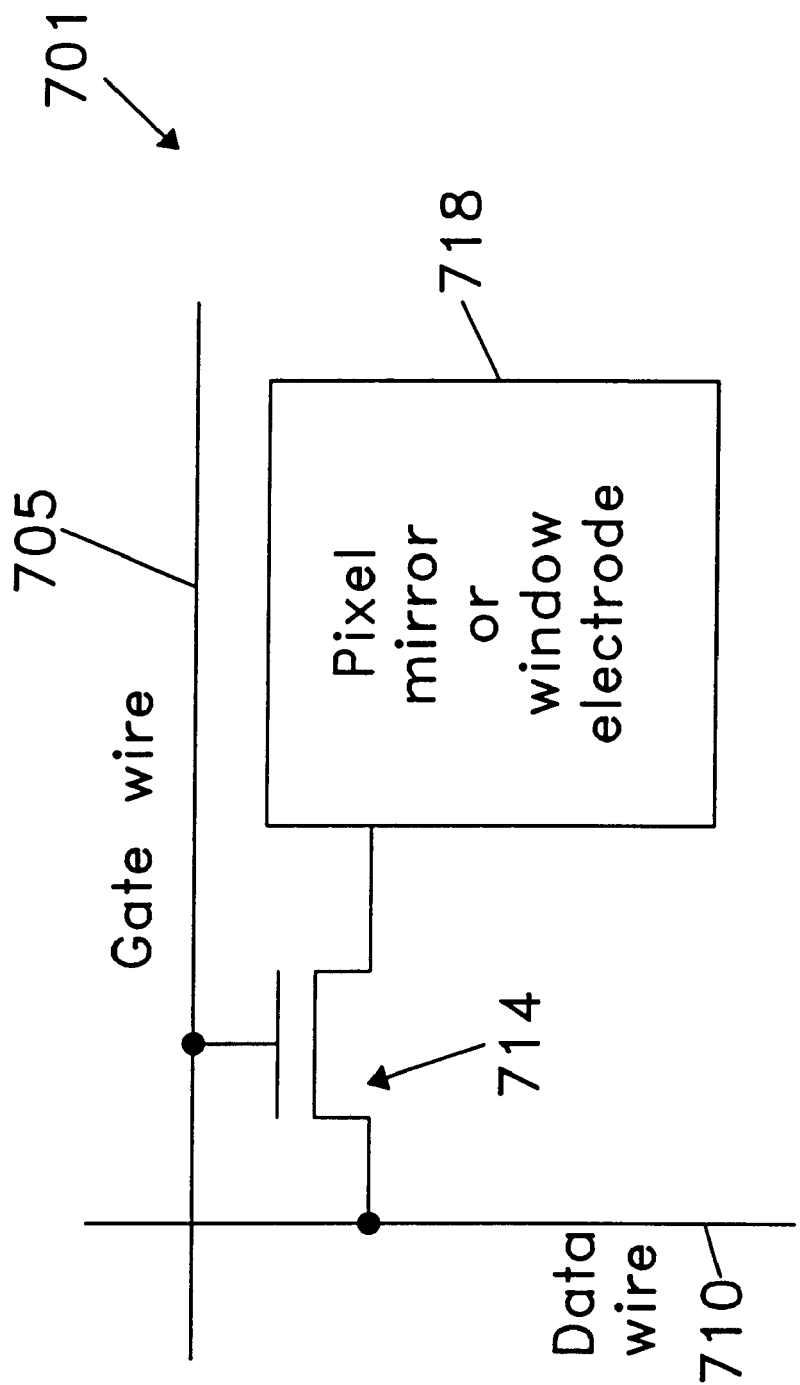
FIG. 1B shows a schematic of a single transistor pixel circuit 701 which is part of a conventional single transistor pixel array system.
Figure 1C:
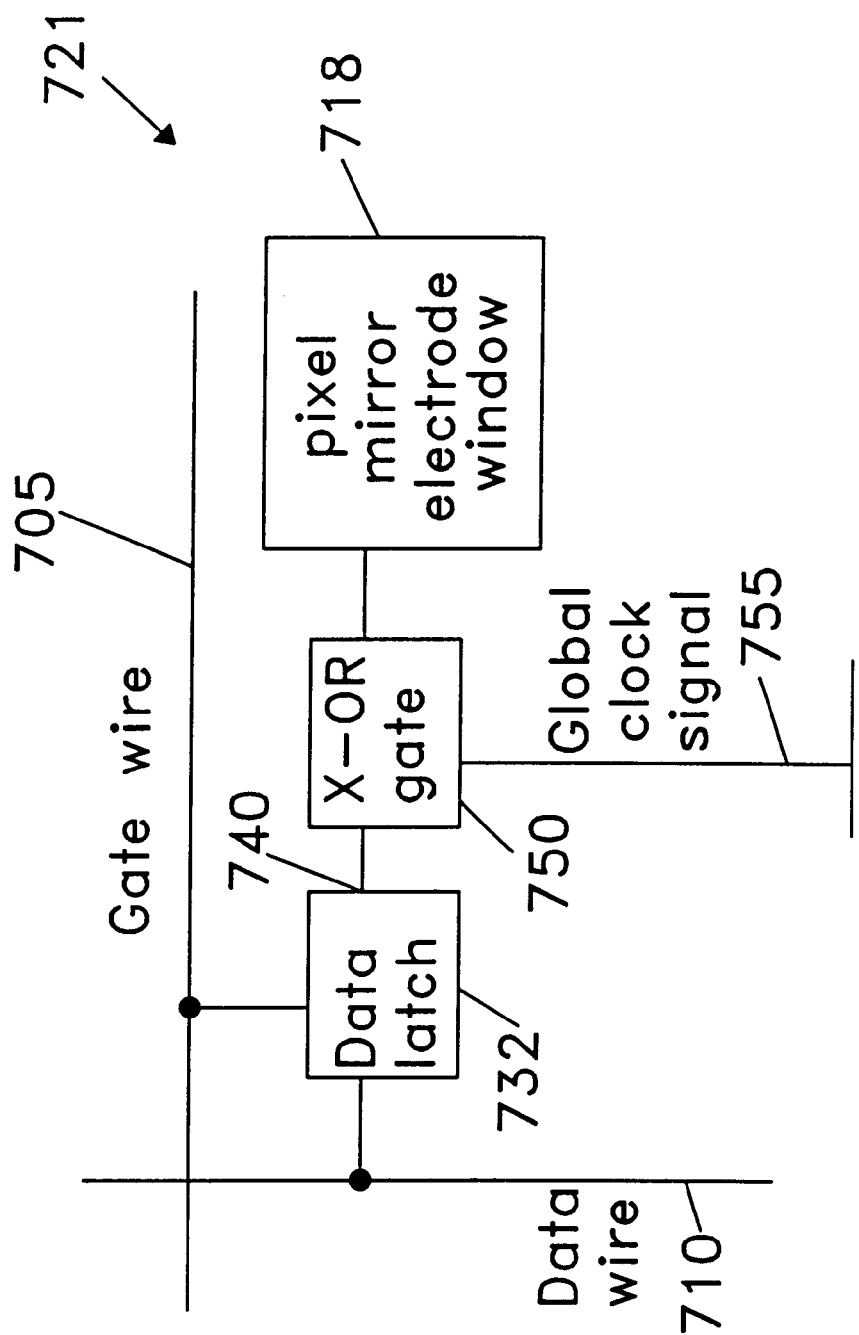
FIG. 1C shows a schematic of a static pixels circuit 721 referred to as a SRAM pixel.
Figure 1D:
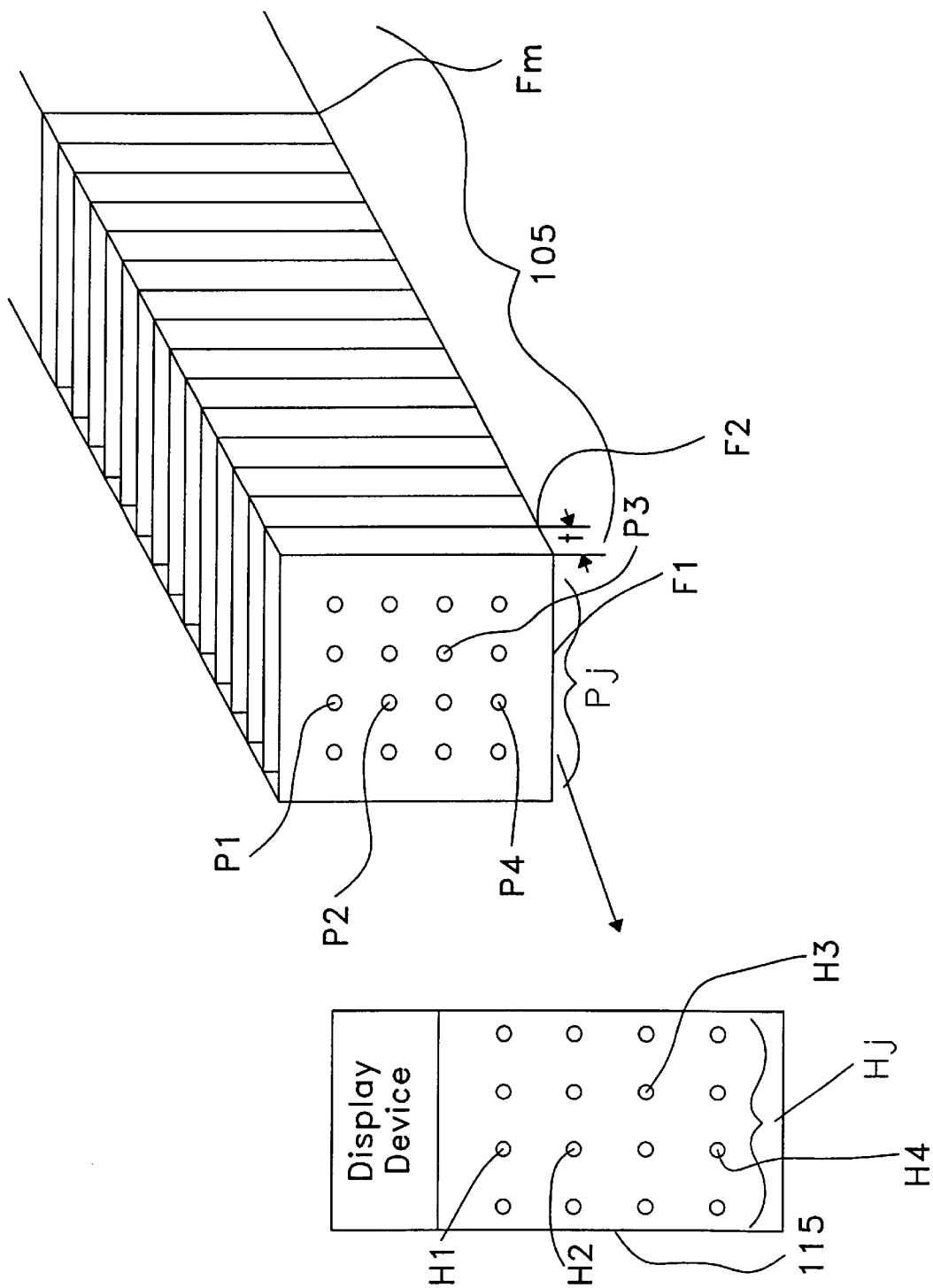
FIG. 1D shows schematically the same sequence of binary images shown in FIG. 1A as they are input to a binary display device.

FIG. 1D shows schematically the same sequence of binary images 105 shown in FIG. 1A as they are input to a binary display device 115 which has hardware pixels Hj which are either on or off (bright or dark) corresponding to the respective values Pj in frames F1-Fm. Note that although a 4 by 4 pixel display and images are depicted, the following discussion applies to any display and frame size.

Suppose P1 is 1 (ON) for every frame F1 through Fm, P2 is 1 (ON) for frames F1 through Fm-1 and is 0 (OFF) for frame fm, P3 is 1 ON only for frames F1 and F2 and 0 (OFF) for frames F3-Fm, and P4 is 1 (ON) only for frames F1 and 0 (OFF) for frames F2-Fm.

The rate at which the frames are displayed by display device 115 is 1/t Hz, where t is the time between any two consecutive frames Fj and FJ+1. Since P1 is ON for all frames, pixel H1 remains ON for a time mt. Since P2 is ON for frames F1 to (Fm−1), H2 is ON for a time (m−1)t. Since P3 is ON only for frames F1 and F2, H3 is ON for a time 2t. Since P4 is ON only for frame F1, H4 is ON only for a time t. Integration is achieved as follows. If display device 115 has a quick enough response rate, a person viewing it notices that pixel H4 is slightly brighter than those pixels which were not ON at all, i.e., all pixels Pj other than P1 to P4. Similarly, pixel H3 appears slightly brighter than pixel H4 since it is ON for 2t rather than t. Similarly, H1 appears brighter than H2 because it is ON for a time mt whereas H2 is ON for a shorter time (m−1)t.

In all of the above statements, it is assumed that the time t is short enough that a person would not actually see or notice that H4 is ON for time t and then off for the rest of the time (m−1)t, whereas H1 is ON for the entire time mt. Instead, the viewer both H1 and H4 appear to be ON, but H1 is much brighter than H4.

Figure 1E:
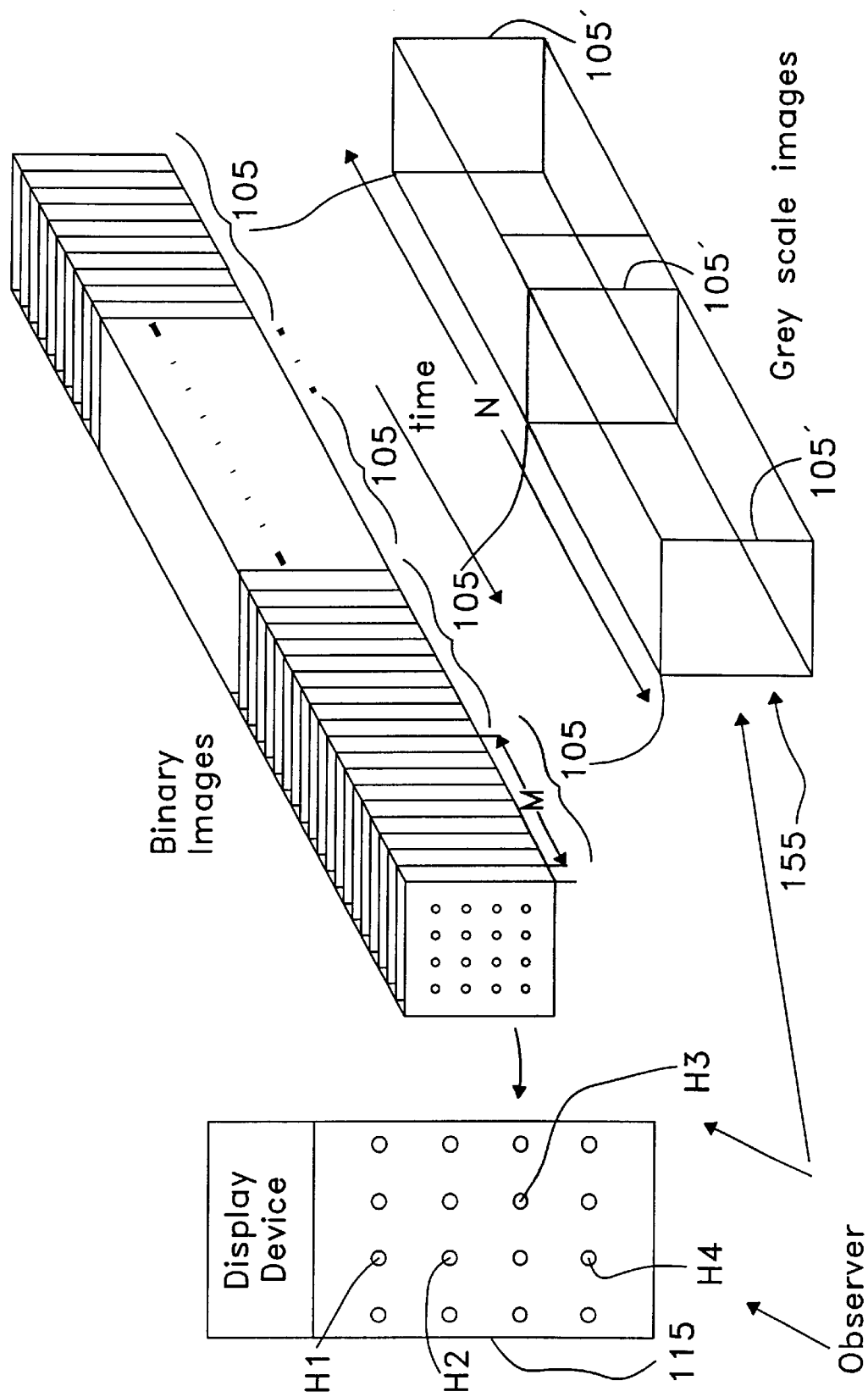
FIG. 1E shows a series of groups of m frames.

FIG. 1E shows a series of groups 105 of m subframes. Here, the total number of subframes being viewed is N, and again the rate at which each frame is updated is 1/t where t is the time between frames. Each group 105 is integrated by the human eye of the observer viewing device 115 so as to appear as a series 155 of grey-scale images 105' each corresponding to the group of images 105 after integration. Here, m subframes are required to form a single grey-scale (or color) image or frame and N subframes form a sequence of grey-scale (or color) images.

Figure 1F:
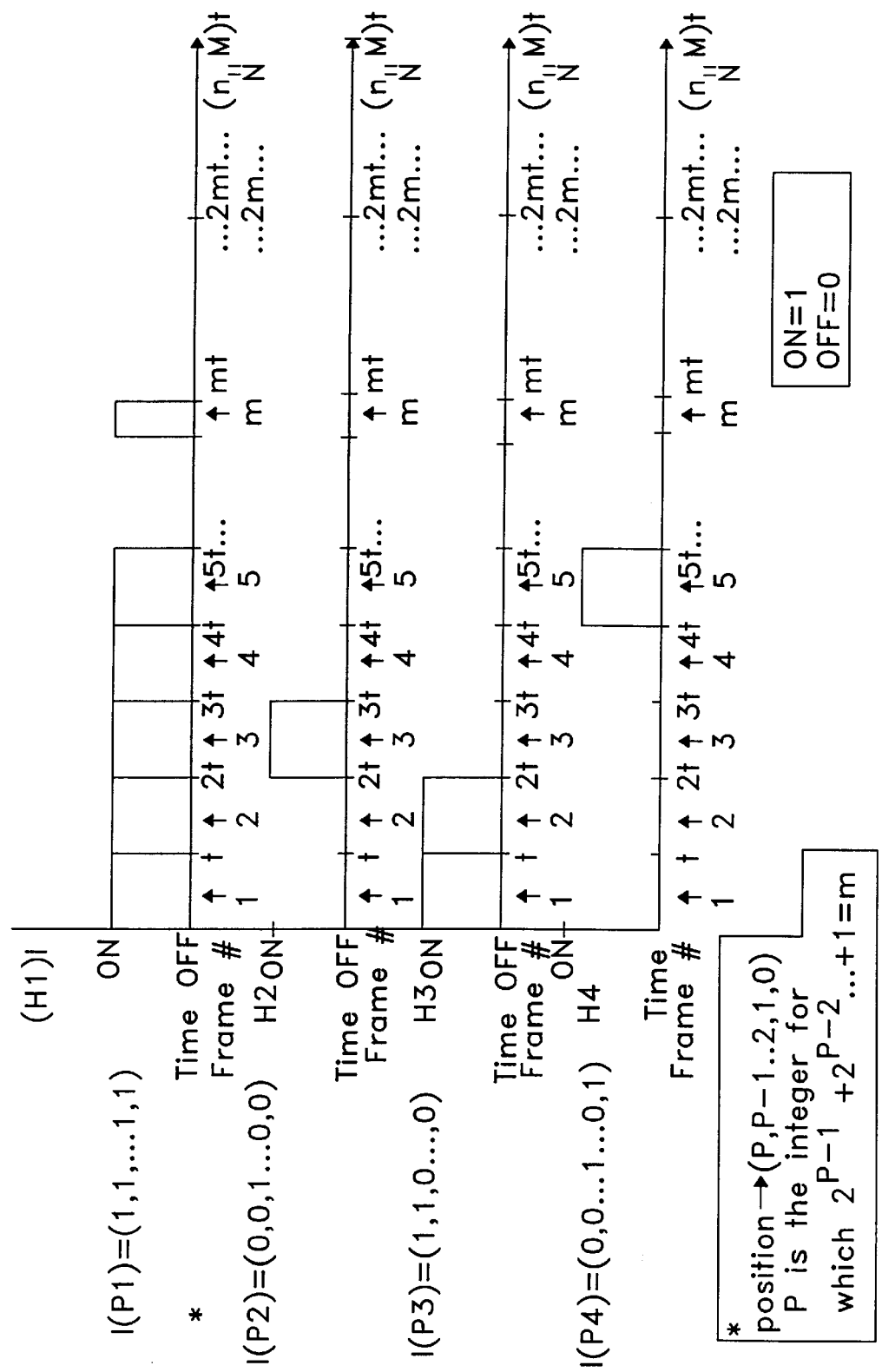
FIG. 1F provides a brief demonstration of the integration process.

FIG. 1F provides a brief demonstration of the integration phenomenon. In particular, FIG. 1F shows intensity output by H1–H4 H4 of I(P1), I(P2), I(P3) and I(P4) versus time for four points P1–P4 under a hypothetical situation. The number of subframes is m. The following discussion relates to the first group 105 of subframes. Pixel H1 is ON for the entire m subframes, H2 is ON during the third sub-frame and off the remaining subframes, H3 is ON for the first and second subframes and OFF for the remaining subframes, and H4 is ON for the 5th subframe and off for the remaining subframes. If the rate 1/t is sufficient such that integration occurs in the viewers mind, then the intensity I(Pj) would appear to be as follows (intensities are relative intensities). I(P1)=(1,1, . . . , 1)→m, I(P2)=(0,9,1,0 . . . , 1→1, I(P3)= (1,1, . . . , 0,0)→2, and I(P4)=(0,0,0,0,1 . . . 0,0),→1. Note that the peak intensity is represented by the time sequence (1,1 . . . ,1) (the lowest intensity is (0, . . . , 0)). Also, note that the intensity at point P2 will appear (if properly integrated) to be the same as the intensity at point P4 and their order of occurrence is not noticeable. Consequently, the subframes can be interchanged within a group 105 and provide the same grey-scale image to an observer when properly integrated by the observer, and indeed the correct distribution of subframes may aid the process of integration.

Figure 1G:
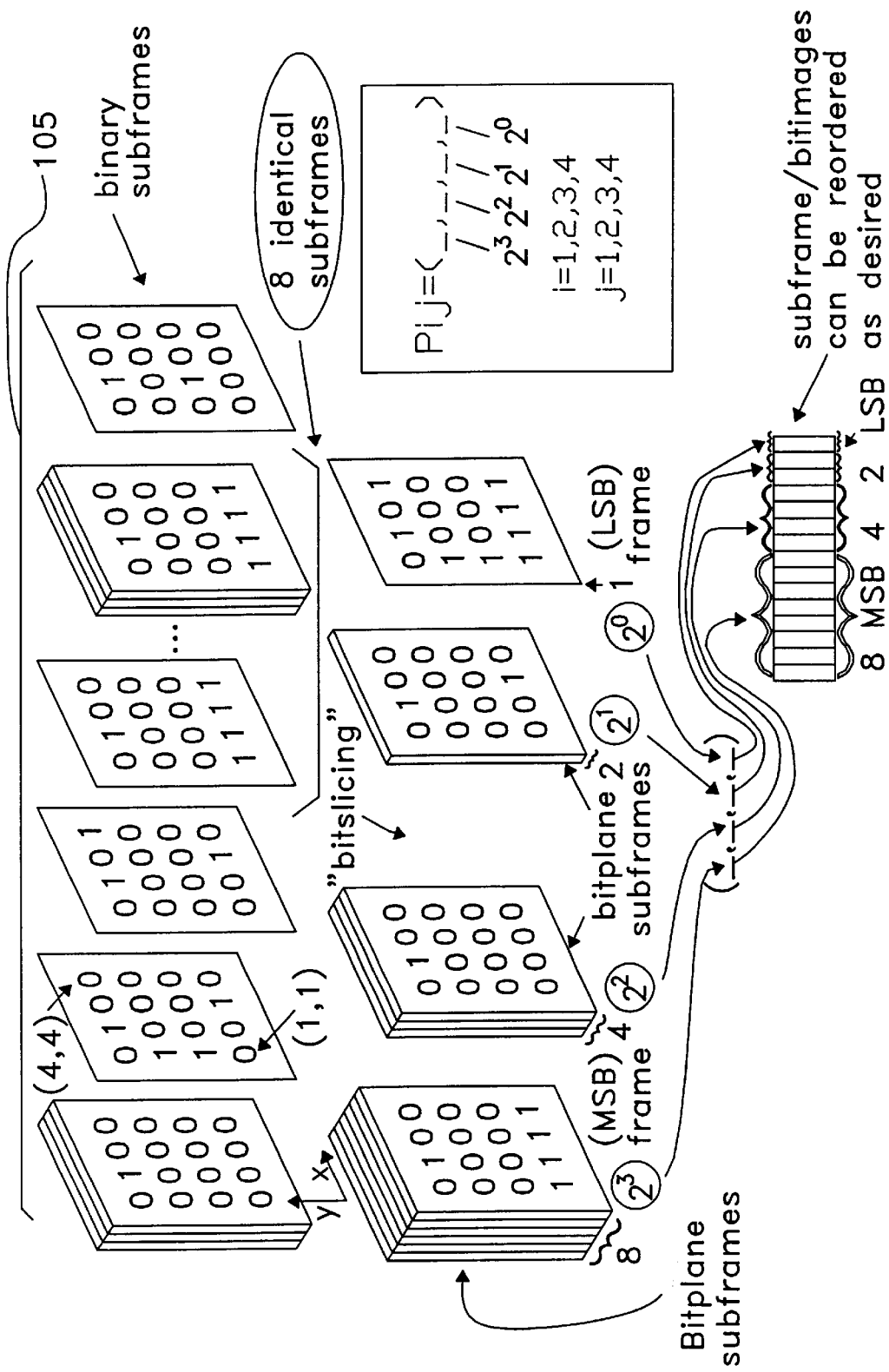
FIG. 1G shows an example of how a series of binary images which will be arranged into "bit plane" binary subframes which in turn can be displayed to appear to a viewer to be an pixel image with a 4 bit grey-scale.

FIG. 1G shows an example of how a series of 4×4 binary images which will be arranged into "bit plane" binary subframes which in turn can be displayed to appear to a viewer to be a 4×4 pixel image with a 4 bit grey-scale. Note that although FIG. 1G shows a 4×4 pixel images, the transverse dimensions of the images can be any two integers.

Also, these transverse dimensions just happen t be the same as the number of bits of grey-scale which also can be any integer. That is, a 4 bit grey-scale is shown for discussion and demonstration purposes only.

The group 105 of subframes shown in FIG. 1G are binary subframes where ON pixels are represented by 1 and OFF pixels are represented by 0. A total of $2^4-1=15$ such binary subframes 105 are contained in group 105 for 4 bit grey-scale images. Also, since this is a 4 bit grey-scale, there need only be 4 bit plane subframes (this number can be increased, if desired). The most significant bit (MSB) subframe shows an image with all pixels that are ON or 1 for at least 8 subframes in group 105. As can be seen, only pixels (2,4) (which (2,4) is ON in all of the subframes in group 105) and all of the pixels on the Y=1 row, i.e., (1,1), (2,1), (3,1) and (4,1) (which is repeated 8 times). The next most significant bit (the $2^2=4$) or third bit rearranged into 4 sets of bit-plane subframes. Only pixel (2,4) is ON in this example for all of these bit-plane subframes. The next to the least significant subframe has two pixels ON, namely, (2,4) which is ON for all subframes as discussed above, and (3,1) which is ON for the 8 identical subframes and for 2 additional subframes within group 105.

The process of arranging subframes from group 105 into the so-called bit-plane subframes can be done in a wide variety of ways and is referred to here as "bit slicing". One approach is as follows. The binary data which represents the stream of binary images could be stored in a computer memory in, for example, a format where an 8-bit byte represents the grey level to be displayed by a particular pixel (in a particular color) after integration. One way of generating subframe from such a representation is to simply form a 1-bit binary bit-plane subframe from each of the bits of the 8-bit byte. This would be done in software by performing a logical AND operation between the byte representing the pixel grey level and a byte containing all the "0"s except for a single "1" in the correct position in the byte to extract the desired subframe. One hardware implementation could be to read directly the desired bit for the bit-plane subframe from the stored byte by constructing the memory hardware in such a way as to facilitate selectable bit-read operations instead of byte-read operations.

One difficulty or potential problem with the above approach is that the display device 115 must be capable of responding to the time t (which relates to the frame rate 1/t). This places a limitation on which displays can be used. Namely, only those display devices can be used which have response rates at least as great as 1/t Hz or frames per second.

The situation discussed with reference to FIGS. 1A, 1C–1F can be used to produce color images with grey-scale in Red, Green and Blue as follows. Suppose that m=100, N=10,000 and t=0.1 milliseconds. These numbers would make available, in one second 100 frames or images, each comprised of 100 binary sub-frames (corresponding to frames 105 in FIGS. 1A, 1D, and 1E) to generate one grey-scale image for one color. If a complete color image is desired, then three grey-scale images (one each for red, green and blue) would be required. In that case, approximately 32 subframes would be available for each Red, Green and Blue image if we wish to display 100 color images.

These 32 subframes can be used to produce 33 equally spaced grey levels which is equivalent (approximately) to 5 bits of grey-scale for each of Red, Green and Blue. This will be discussed in more detail below.

The above phenomenon makes it possible that the subframes can be displayed in any order within a group 105. In addition, some orders of display of subframes may be advantageous over others as will be discussed below. Referring to FIGS. 1D–1F, least significant bit (LSB) subframes and most significant bit (MSB) subframes are defined as follows. A least significant bit (LSB) subframe is defined to be that subframe in which pixels may be ON for only one time t within group 105 of subframes, thus forming the least significant bit of a binary representation of a grey-scale image, and a most significant bit (MSB) subframe is defined to be that set $2^{p-1}$ subframes in which some or all pixels are ON within group 105 of subframes where p is defined as the integer for which the following holds: $2^{p-1}-2^{p-1}+\ldots+2^\circ=(2^P-1)=m$, see FIG. 1F. Hence, the LSB subframe is that single subframe in which the intensity may be ON to contribute the intensity corresponding to the LSB of a grey-scale image, and the MSB subframe is that set of $2^{P-1}$ for which the intensity of a pixel may be ON to contribute the intensity corresponding to the MSB of a grey-scale image.

Namely, since all of the subframes in each group are integrated together, one can display each of the 5 bit planes, i.e., bit 0 (the least significant bit or LSB), bit 1, bit 2, bit 3 and bit 4 (the most significant bit or MSB) as shown in FIG. 2A. In this scheme, the least significant bit (bit 0) frame is displayed for one frame or time period t, the next bit (bit frame) for two frames or time 2t, and the most significant bit (in this case for $2^{P-1}$t, where p=5) for 16 frames or 16t.

In practice, when the frame rates are approaching the lower limits for temporal integrating, it is advantageous to spread the MSB through the frame which corresponds to group 105 in order to remove contouring artifacts as is known in the art. FIG. 2B shows one way this might be done. Comparing FIG. 2A with 2B, it is seen that those pixels which are ON for 16 subframes, i.e., for a total time 16t—thereby corresponding to the MSB or bit 4, they can be turned ON for half of that time or 8t, followed by pixels with bit 3 are ON for 8t, and then re-turn ON the MSB pixels again for the remaining time 8t so that they have been displayed for the necessary 16t time.

It is apparent from FIGS. 2A and 2B that generation of a 24 bit time-sequential grey-scale (or color) images in this way requires a very high speed display, and/or a reduction in image rate (24-bit refers to 8 bit grey-scale for each of the three colors used, which would require 255 subframes for each color. Namely, display system 115 has to run fast enough to display the least significant frame, i.e., the frame displaying the LSB.

Figure 3A:
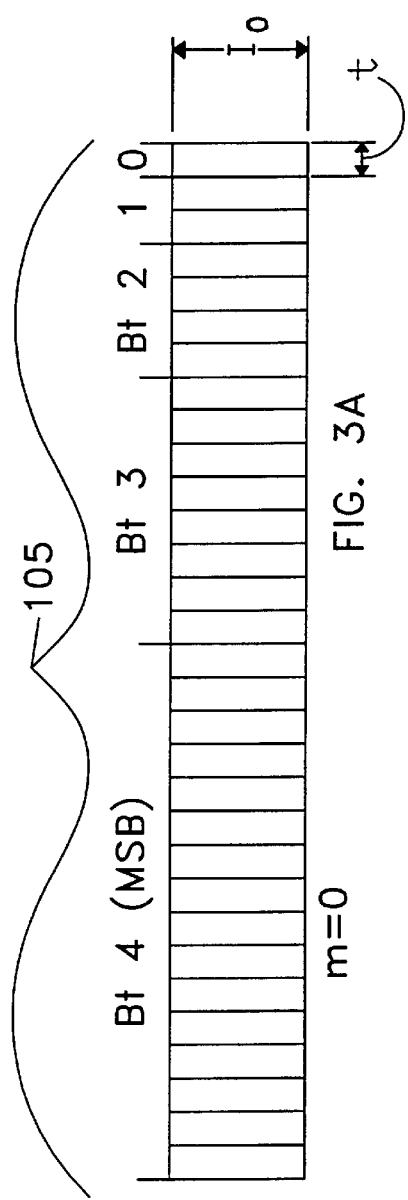
FIGS. 3A, FIGS. 3B, and 3C show an approach for rearranging the frames such that the display system is not required to run at a rate 1/t in order to display the least significant bit (LSB) frame.
Figure 3B:
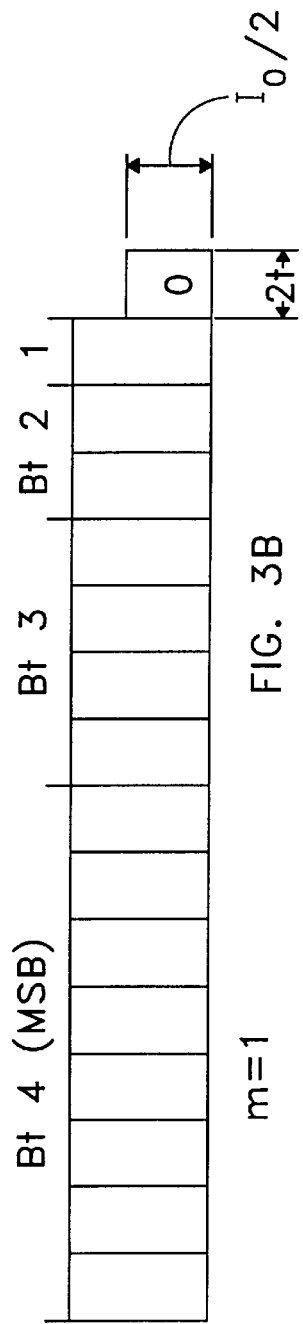
Figure 3C:
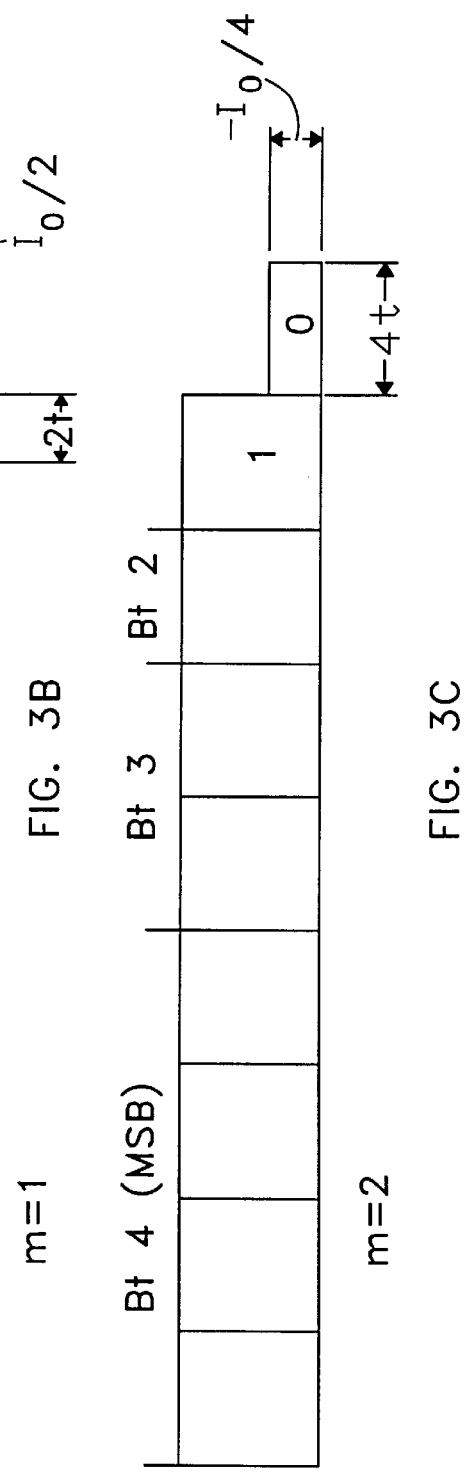

FIG. 3A corresponds to FIG. 2A and FIGS. 3B, and 3C show a method of rearranging the frames such that display system 115 is not required to run at a rate 1/t in order to display the LSB. Note that FIG. 3A shows all pixels displaying the same intensity Io and it is only the amount of time a particular pixel is displayed that results in the grey-scale effect. The MSB subframes are those identical subframes containing pixels which are ON to display the most significant bit. The LSB subframe is the subframe containing pixels which are ON to display the least significant bit.

FIG. 3B shows how the group 105 is combined to effect a 5 bit grey-scale (for each of Red, Green and Blue) without requiring that display device 115 be capable of rates of 1/t. As can be seen, the rate requirement for display device 115 is reduced from 1/t to 1/(2t). In order to compensate for the additional time t that the LSB frames are ON, the intensity of pixels in that frame is decreased by half from Io to Io/2. The letter M' is used to indicate the number of bits which are grouped together to yield the LSB time. Hence, referring to FIG. 3A, m'=0 and hence no additional bit is grouped together with the LSB and thus no decrease in the required rate of performance of display device 115 is achieved. When m'=1, however, the first bit subframes and the 0th bit subframe are grouped together as shown in FIG. 3B and hence the rate requirement of display 115 is reduced by half to approximately 1/(2t). This reduction is accompanied, however, by a new requirement that display device 115 be capable of outputting three different intensity levels, namely Io, Io/2 and 0, rather than the two intensities Io and 0 for the m'=0 case. For a binary display device this may be accomplished by modulating the illumination light at the appropriate time, or modulating the optical output from the display device at the appropriate time.

FIG. 3C takes the process one step further. Here, the LSB frames, the 1st bit frames (frames displaying bits in the next to least bit position) and the 2nd bit frames are grouped together. In this case, the rate requirement for display device 115 is reduced by approximately 75% from 1/t to approximately 1/(4t). In this case, since the next to least significant bit (bit 1) is ON just as long as the bit 2 frames are ON, their intensity is reduced by half to Io/2. Similarly, since the LSB bit frame is ON just as long as the LSB frame, the intensity of the LSB frame is reduced by half, from Io/2 as in FIG. 3B to Io/4. Hence, in this case the rate that display 115 must be capable of functioning, is reduced by approximately 75% from 1/t to approximately 1/(4t). For the example shown in FIGS. 2A and 2B, this means that the 10 kHz frame rate is reduced to 2.5 KHz.

Figure 3D:
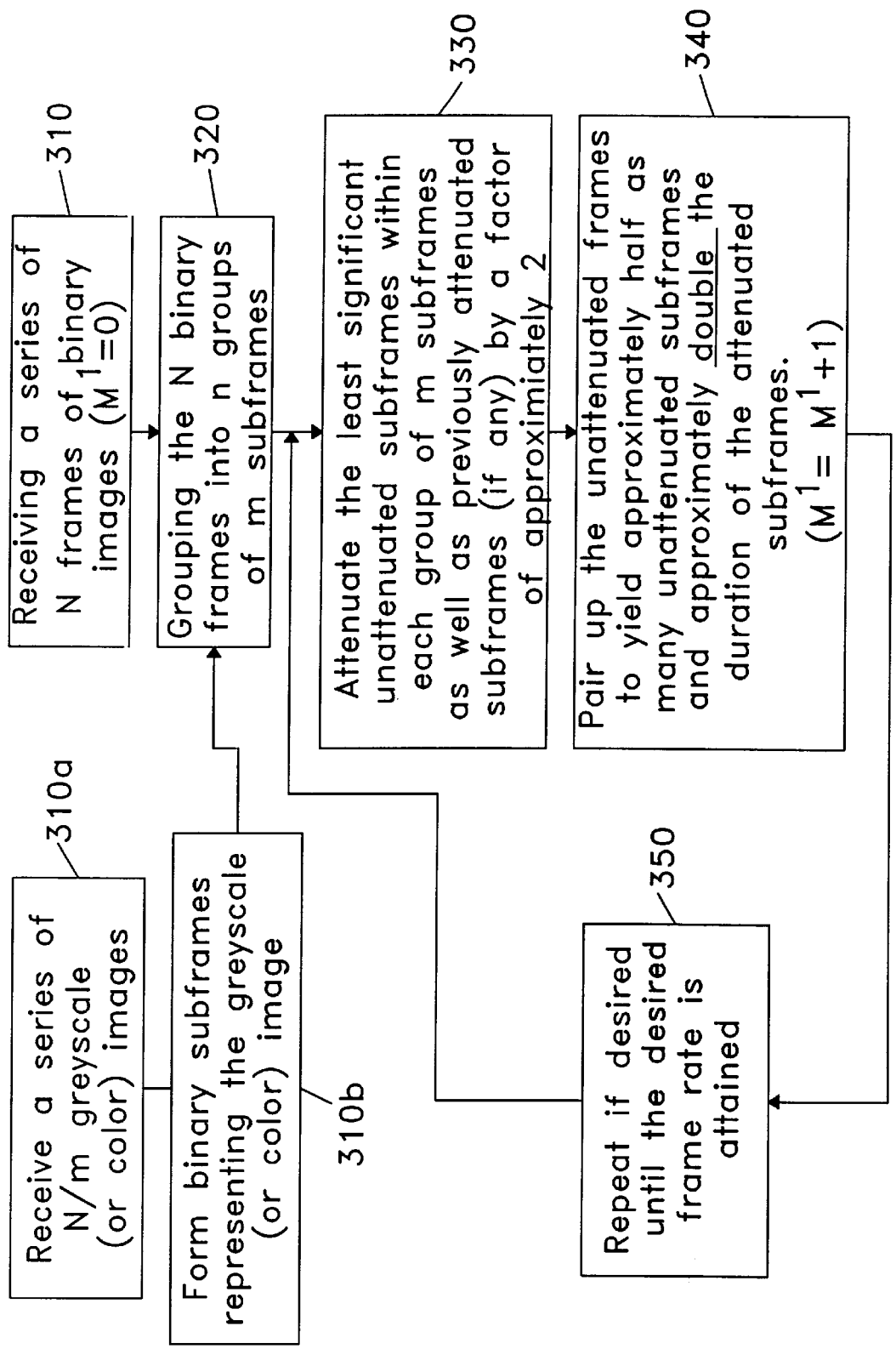
FIG. 3D shows the steps required to achieve the process shown in FIGS. 3A–3C according to one embodiment of the invention.

The approach discussed with respect to FIGS. 3A–3C can be generalized as follows. FIG. 3D shows steps required to generalize the process shown with respect to FIGS. 3A–3C. In particular, FIG. 3D shows step 310 for receiving a series of N frames of binary images (each initially to be displayed at a rate of 1/t), where N is an integer. Alternatively, if grey-scale or color images are received instead of binary images, then step 310 is replaced by steps 310a and 310b. Namely, step 310a involves receiving a series of grey-scale (or color) images and step 310b involves forming binary subframes representing these grey-scale (or color) images.

After either step 310 or steps 310a and 310b are performed, step 320 is performed. Step 310 involves arranging the series of N frames of binary images into n groups of m binary subframes, where m is less than or equal to N. Step 330 involves attenuating the least significant unattenuated subframes within each group of m subframes as well as previously attenuated subframes (if any) by a factor of approximately 2. Step 340 involves pairing up the unattenuated frames to yield approximately half as many unattenuated subframes and approximately doubling thereby, the duration of the attenuated subframes. Please note, however, that by approximately ½ it is meant that the attenuation could be anywhere from a few percent to 20 percent or more of half. The exact amount of attenuation (or variation in intensity) could be determined by simply implementing the attenuation process for various amounts of attenuation and asking observers or viewers which amount of attenuation is most effective. Note that m' is increased by 1 once step 340 has been completed. Step 350 allows one to repeat the last two steps of 330 and 340 until the desired frame rate is achieved.

The above process can be continued and m' increased. For the case of 8 bits, (i.e., m from FIGS. 1A, 1D, and 1E is 255), m' from FIGS. 3A–3C can range from 0 to 7. The number of subframes for m=255 is: 255 for m'=0, 128 for m'=1, 65 for m'=2, 33 for m'=3, 19 for m'=4, 12 for m'=5, 9 for m'=6, 8 for m'=7. The parameter m' is the number of bits which have their illumination attenuated.

The above approach does result in an effective loss of optical throughput. That is, there is a data-rate/throughput trade-off which is shown in Table 1. Note that referring to the left part of Table 1 (m'=1,2), the optical throughput is slightly reduced for a significant reduction in the frame rate required for a given image-rate.

Also note that the relative data rate is shown for two different situations. The first calculation corresponds to the timing which is drawn in FIGS. 3A–3C for clarity. In this case, the time taken to display a complete grey-scale image is increased slightly with m'. This can be seen if one compares FIG. 3A with FIGS. 3B or 3C in which one can clearly see that the overall data rate is decreased. That is, the attenuated subframes extend further to the right in FIGS. 3B and 3C than FIG. 3A. Consequently, in practice, a second calculation can be made to adjust the data rate by shortening the frame durations from 2t (FIG. 3B) or 4t (FIG. 3C) to slightly less than that amount to achieve the data rate to perceive the same image rate. The approximate amount of adjustment can be calculated as follows. If $B_m$ is the number of subframes for a given m', and if m is the number of subframes when m'=0, then as subframes are paired in order to go from FIG. 3A to 3B to 3C, they should be shortened by a fraction of about $(mt)/[(B_m\ 2^{m'})t]=m/[(B_m\ 2^{m'})]$, where mt is the duration of the subframes 105 with m'=0 and $(B_m\ 2^{m'})t$ is the duration of the subframes 105 when for m' not equal to 0.

attenuate it to half its value and increase its duration by a factor of two (along with other already attenuated frames). Then the remaining unattenuated frames can be combined into half as many unattenuated frames. For example, to go from m'=2 to m'=3 the process is as follows. At m'=2, there are 63 unattenuated subframes and 2 attenuated ones. Taking the least significant unattenuated frame, attenuate it by a factor of two (also attenuate the two attenuated frames by another factor of two). We now have 3 attenuated subframes and 62 unattenuated subframes which are converted to 31 unattenuated frames of double the duration. This yields 34 subframes.

The effective attenuation of the illumination can be achieved in several ways. One approach is to modulate the intensity of the illumination applied to the entire display device 115 at the appropriate time. Another approach is to modulate the transmission of an element between the display and the viewer. Another approach is to pulse modulate the illumination source which illuminates the display device at the appropriate time to illuminate the attenuated subframes for a shorter duration. Another approach is to use a display device that has that capability of simultaneously allowing subframe data to be loaded at the rates described above but then to be displayed for a shorter time similar to the case of pulse modulated illumination described above. The illumination sources in some such devices are easier to adjust than others.

FIGS. 4A, 4B and 4C show these two approaches for the above discussed case of illumination modulation corresponding to FIG. 3C (m'=2) with a frame rate of 1/(4t). In particular, FIG. 4B shows intensity modulation as discussed above. FIG. 4C, however, shows an intensity output to achieve the same or nearly the same result. Again, the intensity profiles are for the source illuminating display device 115. Here, the intensity of all of the bits remains the same and it is their duration which is varied. For example, the duration that the pixel source is ON for the LSB is time t0, which is less than the time 4t shown in FIGS. 4A and 4B. The next to last bit or bit 1 is ON for a time t1 greater that t0 but less than 4t (otherwise it would appear as bright as a pixel with bit 2 ON). In particular, the lengths t0 and t1 are adjusted in a manner similar to the adjustment of intensity in that t1 is approximately half of the total time 4t, i.e., t1 is about 2t. Similarly, t2 is approximately half of t1 and hence approximately one fourth or 4t or simply t.

Figure 4D:
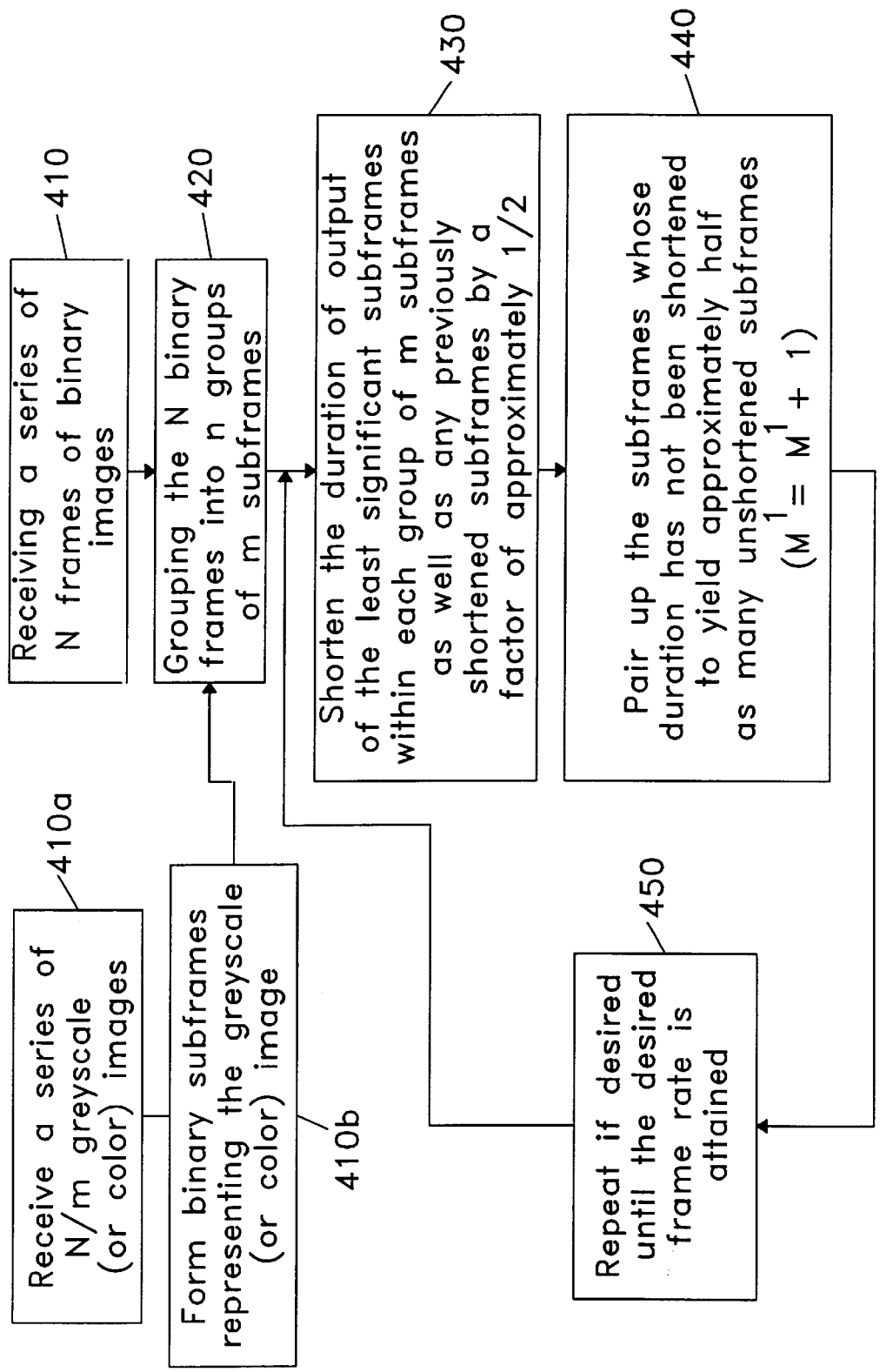
FIG. 4D shows a method for displaying a grey-scale image on a display unit with a plurality of pixels according to another embodiment of the invention.

FIG. 4D shows a method for displaying a grey-scale image on a display unit with a plurality of pixels according

TABLE 1

| (grey-scale level = 256) | | | | | | | | |
|---|---|---|---|---|---|---|---|---|
| subframes | 255 | 128 | 65 | 34 | 19 | 12 | 9 | 8 |
| m' | 0 | 1 | 2 | 3 | 4 | 5 | 6 | 7 |
| Rel throughput | 100% | 99.6% | 98% | 94% | 84% | 66% | 44% | 25% |
| Rel. data rate (FIG. 3) | 1 | 0.5 | 0.25 | 0.12 | 0.06 | 0.03 | 0.015 | 0.008 |
| Rel. data rate (constant image rate) | 1 | 0.5 | 0.255 | 0.13 | 0.07 | 0.05 | 0.035 | 0.03 |

The above table is calculated using the steps in FIG. 3D which can be summarized as follows. Starting with the unattenuated subframes, remove the least significant one and to another embodiment of the invention. Step 410 involves receiving a series of N frames of binary images each to be displayed at a rate of 1/t, where N is an integer. Alternatively, if grey-scale or color images are received instead of binary images, then step 410 is replaced by steps 410a and 410b. Namely, step 410a involves receiving a series of grey-scale (or color) images and step 410b involves forming binary subframes representing these grey-scale (or color) images. Step 420 then involves arranging the series of N frames of binary images into n groups of m binary subframes, where m is less than or equal to N. Step 430 involves shortening the duration of output of the least significant subframes within each group of m subframes as well as any previously shortened subframes by a factor of approximately ½. Please note, however, that "approximately" ½, means that the shortening could be about 50% + or −20% or possibly more—this can be determined by simply implementing the shortening process for various amounts of shortening and observing which amount of shortening is most effective. Note that m' is in fact increased by 1 once step 440 has been completed. Step 450 allows one to repeat the last two steps of 430 and 440 until the desired frame rate is achieved.

Display device 115 can include any time-sequential (grey-scale) display whether liquid-crystal on silicon, digital mirror devices, etc . . . . Even if the light modulation mechanism is intrinsically capable of very high frame rates, the data rates from the display driving electronics as well as the display itself should be reduced for reasons of cost and cabling convenience.

All of the above discussion can be applied to color displays which briefly discussed earlier. Here, the color light source may be, for example, 3 separate light sources, namely, a red light source, a green light source and a blue light source. These color light sources can be, for example, a red light emitting diode, a green diode, and a blue diode, respectively or a white light source which is sequentially filtered to appear red, green or blue, or a filter between the display and the viewer which is sequentially switched to transmit red, green or blue. Each of these light sources is treated in a manner analogous to the above light source for grey-scale. In each of these situations, the output intensity is not attenuated in intensity or shortened in duration. Color "grey-scale" can be achieved, however, by applying either the steps of FIG. 3D for attenuation or the steps of FIG. 4D for duration shortening. This can be achieved for each of the light sources. That is, each of the red, green and blue light sources can be integrated by an observer as discussed above. For example, if the red light source outputs frames as in FIG. 3A with m'=0, then the rate of output can be reduced to approximately ½ that rate by attenuating the intensity of the red light source at the pixels in the least significant frame to approximately ½ (i.e., from Io to approximately Io/2), and then combining the unattenuated frames in pairs of duration 2t and doubling the duration of the least significant frame from t to 2t in the same manner as discussed in FIGS. 3A–3D and in particular in steps 330 and 340. This process can be repeated (see step 350 in FIG. 3D). This procedure can be done for each of the red light source, green light source and blue light source.

Another example involves applying the method of FIGS. 4A–4D to each of the red, green, and blue light sources. For example, if it is desired that the red light source output frames as in FIG. 4A (which corresponds to m'=2), then instead of outputting the least significant frames with pixel outputs of the red light source at Io/4, the duration of the illumination or attenuation of those pixels is reduced by 4 from 4t to t. Similarly, instead of outputting the next to least significant frames with pixel outputs of the red light source at Io/2, the duration of those pixels is reduced by approximately 2 from 4t to 2t as shown in FIG. 4C. This process can be repeated as in steps 450 in FIG. 3D. This procedure can be done for each of the red light source, green light source and blue light source. Note that it may be advantages to intersperce red, green, and blue subframes to aid the integration process.

In practice, color displays are typically achieved using a RGB source where R corresponds to a subframe of pixels which are displaying red, G corresponds to a subframe of pixels which are displaying green, and B corresponds to a subframe of pixels displaying blue. Then the light source is used to output the following subframes. Referring to FIG. 3A, suppose the corresponding series of red subframes, green subframes and blue subframes are arranged as follows:

RRRRRRRRRRRRRRRRRRRRRRRRRRRRRRRGG GGGGGGGGGGGGGGGGGGGGGGGGGGGGGBBB BBBBBBBBBBBBBBBBBBBBBBBBBBBBBB . . . , where each capital letter corresponds to a frame in FIG. 3A and this example m=31 (recall that m is the total number of subframes).

If each of the red, green and blue sources undergoes the process of FIG. 3B via implementation of steps 310–340 time (so that m'=1), then the least significant frame (to be attenuated) can be represented by small letters r, g, and b for red, green, and blue, respectively. Using the above nomenclature, the output during illumination, the red, green and blue sources would be:

| RR | RR | RR | RR | RR | RR | RR | RR | RR | RR | RR | RR | RR | RR | RR | rr |
| GG | GG | GG | GG | GG | GG | GG | GG | GG | GG | GG | GG | GG | GG | GG | gg |
| BB | BB | BB | BB | BB | BB | BB | BB | BB | BB | BB | BB | BB | BB | BB | bb | where a space is depicted here only to make clear that two of the unattenuated frames are combined, it being understood that the spaces are analogous to the vertical lines separating frames in FIG. 3B. Typically, the RGB source outputs frames in the sequence RGBRGBRGB . . . . Hence, the above could be output as RR GG BB RR GG BB . . . rr gg bb. As previously discussed, however, the order of the frames may be changed to aid the process of integration. Finally, the above series of frames could also have a shortened duration (as discussed in FIGS. 4A–4CD) of the least significant frame as can be shown as follows:

| RR | RR | RR | RR | RR | RR | RR | RR | RR | RR | RR | RR | RR | RR | RR | R |
| GG | GG | GG | GG | GG | GG | GG | GG | GG | GG | GG | GG | GG | GG | GG | G |
| BB | BB | BB | BB | BB | BB | BB | BB | BB | BB | BB | BB | BB | BB | BB | B | where a single letter R, G, or B, means that the duration of time that the pixel is ON is approximately half as long as the other pixels but the intensity of those pixels is not attenuated. Here again, the order of the frames can be altered and still appear the same to an observer.

For m'=2, the above can is combined as follows:

| RRRR | RRRR | RRRR | RRRR | RRRR | RRRR | RRRR | rrrr | ssss |
| GGGG | GGGG | GGGG | GGGG | GGGG | GGGG | GGGG | gggg | hhhh |
| BBBB | BBBB | BBBB | BBBB | BBBB | BBBB | BBBB | bbbb | cccc | where a space is analogous to the vertical lines in FIG. 3C, and s, h and c are each half the intensity of r, g and b, and one fourth of the intensities of R, G, and B, respectively.

Again, it may be useful to change order within the group of m frames, the above could be output in a variety of ways including RRRR gggg BBBB rrrr GGGG bbbb RRRR GGGG BBBB BBBB . . . RRRR hhhh BBBB ssss GGGG cccc. Again, the above series of frames could also have a shortened duration of time as discussed above with respect to FIGS. 4A–4D as follows:

| RRRR | RRRR | RRRR | RRRR | RRRR | RRRR | RRRR | RR | R |
| GGGG | GGGG | GGGG | GGGG | GGGG | GGGG | GGGG | GG | G |
| BBBB | BBBB | BBBB | BBBB | BBBB | BBBB | BBBB | BB | B | where double letters RR, GG, and BB mean that the duration of the frames is approximately half as long as for the frames RRRR, GGGG and BBBB, respectively (but the intensity is the same). Similarly, the single letters R, G, and B, have durations of time that is half as long as the frames RR, GG, and BB, and one fourth as long as frames RRRR, GGGG, and BBBB. Here again, the order of the frames can be altered and still appear the same to an observer. Again, it should be understood that all of the attenuations and shortenings are approximate as discussed above.

Figure 5A:
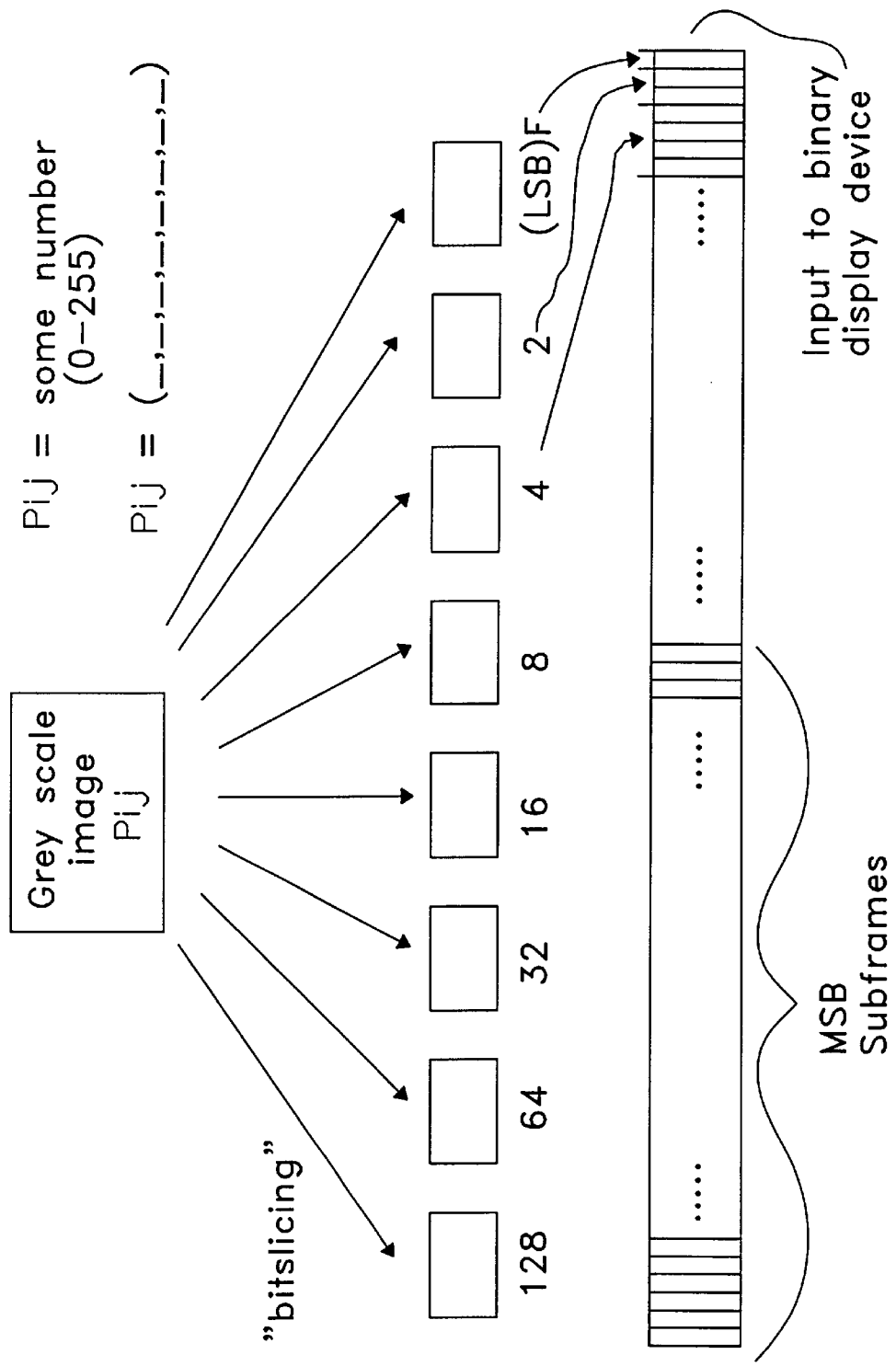
FIG. 5A shows how 8 bit grey-scale images (or 3×8 bit color images) can be displayed using a binary display device such as the device of FIG. 1F.

FIG. 5A shows how 8 bit grey-scale images (or 3×8 bit color images) can be displayed using a binary display device such as device 115 of FIG. 1F. Although 8 bit subframes are shown, it should be understood that any number grey-scale can be used if the application demands greater or lesser precision. One way this can be done is to generate the sequence of subframes from bit-frames derived from analog signals. To do this the analog signal (or signals if R, G, and B have been separated), which represents the brightness of the image on a series of scan lines could be sampled with an analog-to-digital converter (ADC). The outputs from the ADC then become the binary values for the bit-frames corresponding to the value of the respective ADC outputs. As the analog signal is repeatedly sampled, the pixels in the bit-frames are assigned values in a sequence which matches the raster scanning pattern used in the analog signal representation.

Figure 5B:
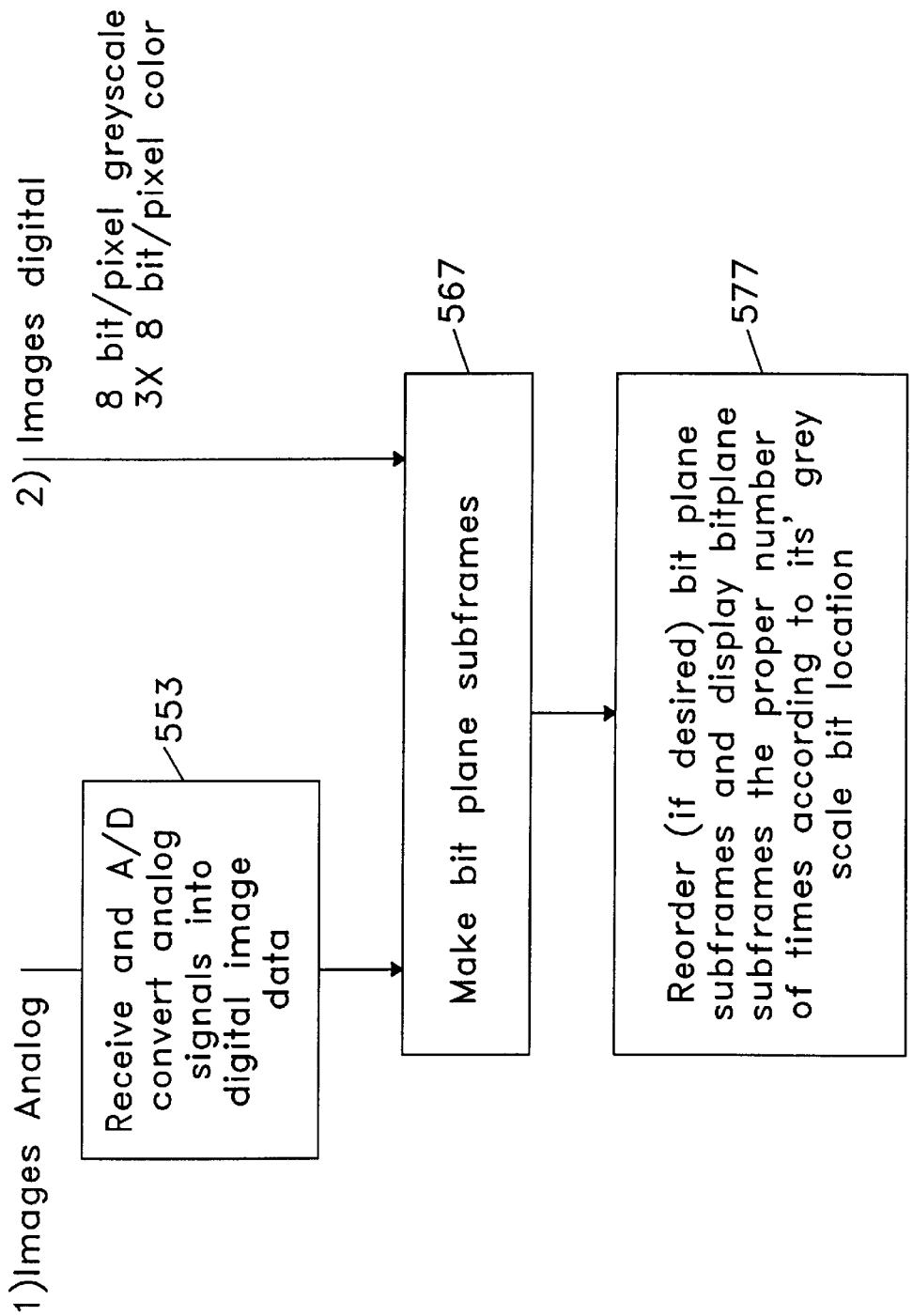
FIG. 5B demonstrates how analog image signals as well as digital data (such as the images of FIG. 5A) can lead to binary subframes which in turn can be displayed via the methods of FIGS. 3A–3D and 4A–4D.

FIG. 5B demonstrates how analog image signals as well as digital data (such as the images of FIG. 5A) can lead to binary subframes which in turn can be displayed via the methods of FIGS. 3A–3D and 4A–4D. In the example shown in FIG. 5B, 8 bit grey-scale or 3×8 bits pixel color are discussed, it being understood that any number of bits could be used. FIG. 5B involves either: 1) receiving images in analog form at step 553 and converting these images into digital image data; or 2) receiving the digital images directly. Once received, these digital images are rearranged into bit plane subframes at step 567. Again, as discussed above with respect to FIG. 5A, it the digital images are grey-scale images or color grey-scale images, then step 567 involves bit slicing as shown in FIG. 5A. Alternatively, if the digital images are binary subframes, then step 567 involves bit slicing as shown in FIG. 1G. Finally, step 577 involves reordering (if desired) the resulting bit plane subframes and displaying those bit plane subframes the proper number of times in accordance with that bit plane's grey-scale bit location. That is, as discussed above, if an 8 bit grey-scale is desired, then the MSB subframe is displayed $2^7$=128 times, the next to the MSB subframe is displayed $2^6$=64 times etc. . . . , to the LSB subframe which is displayed one time. Recall that there may be advantages in not displaying each bit frame (especially for the MSB) all together or in succession. That is, sometimes, in order to avoid flicker, the MSB and other images can be split up and intermittently displayed.

Figure 6A:
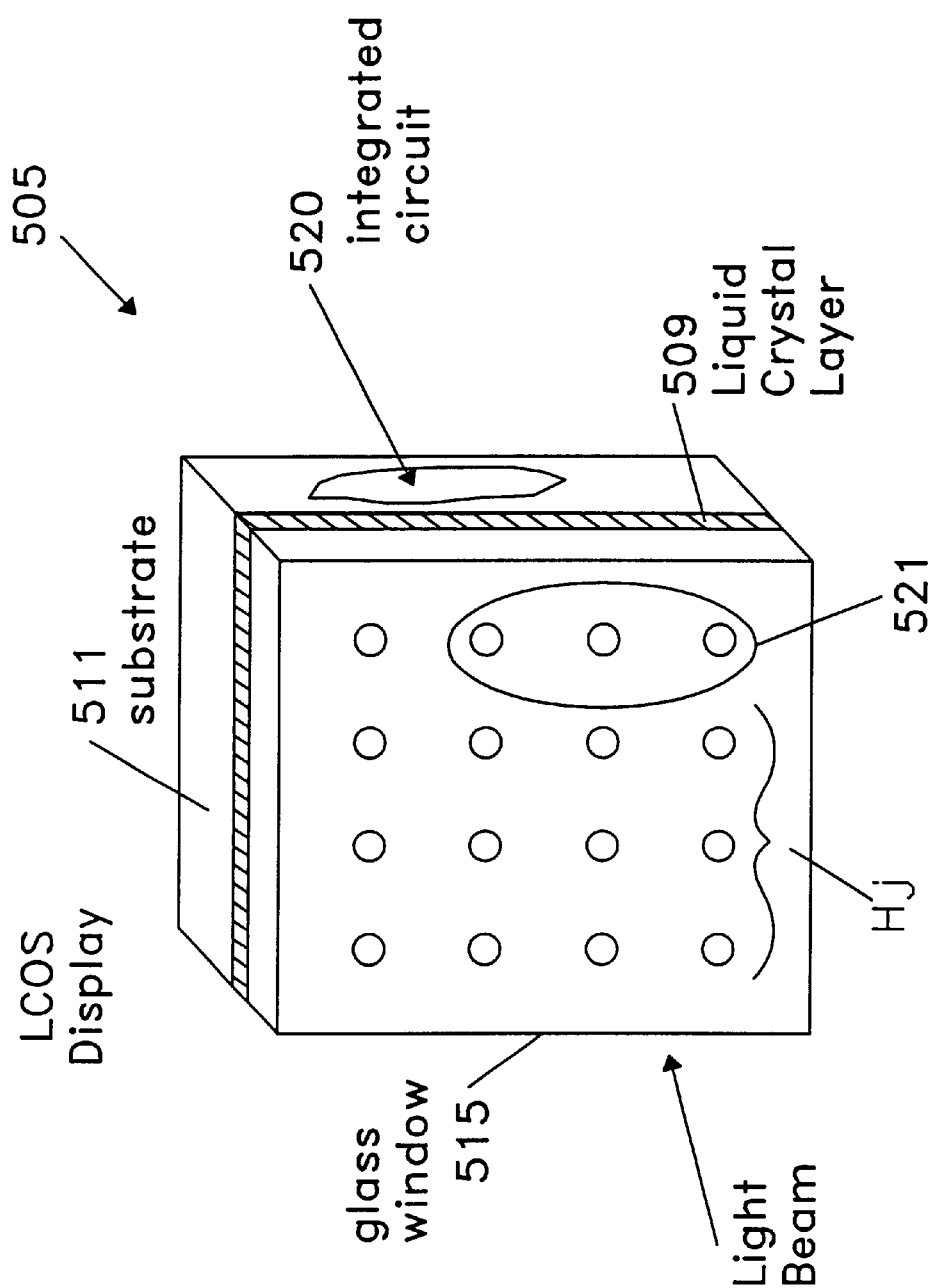
FIG. 6A shows a display which can serve as display 115 and FIG. 6B shows a close-up view of any one of pixels Hj according to another embodiment of the invention.
Figure 6B:
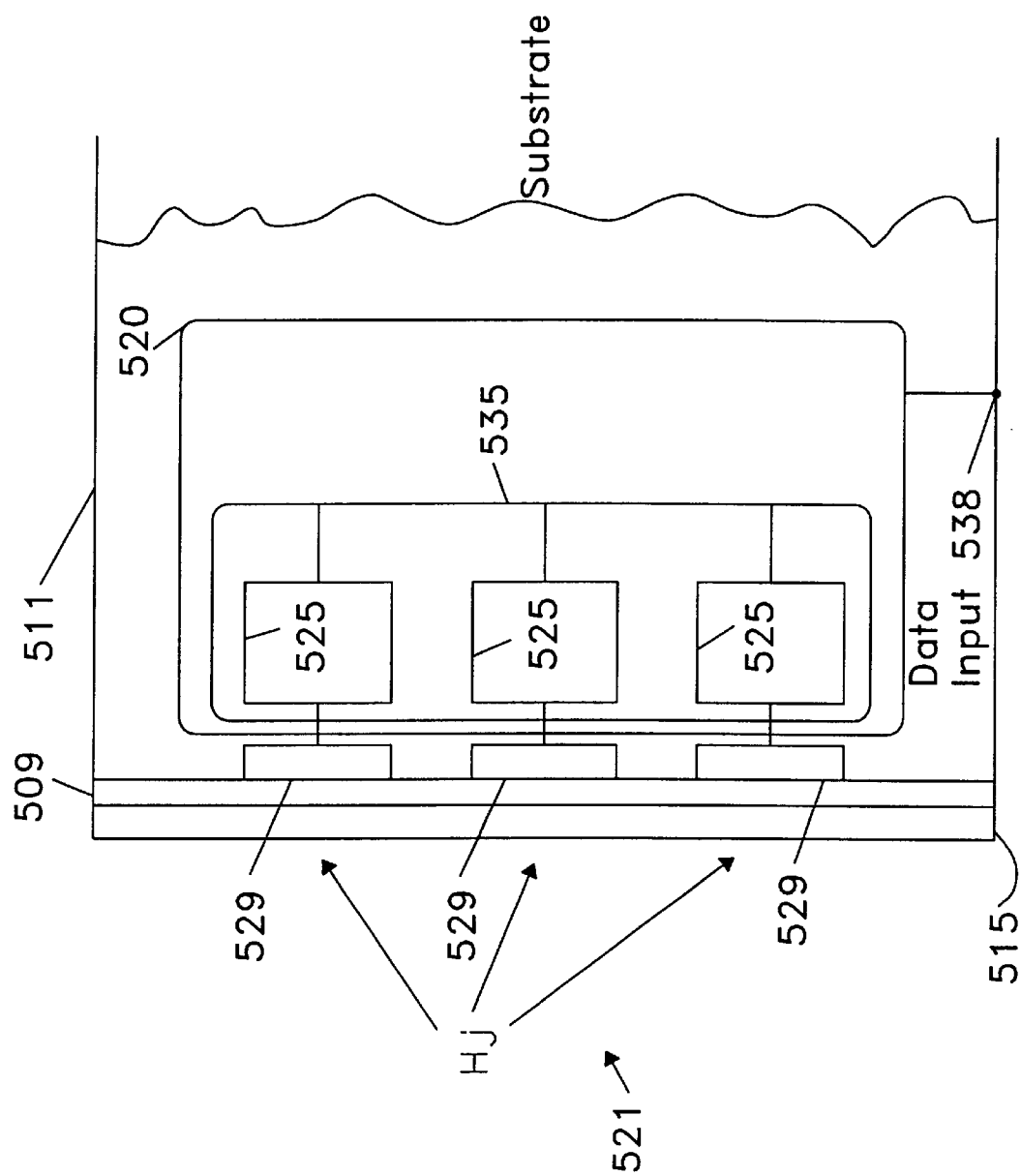

FIG. 6A shows a display 505 which can serve as display 115 and FIG. 6B shows a close-up view of any one of pixels Hj. Liquid crystal on silicon (LCOS) displays or spatial light modulators could serve as display 115. In particular, referring to FIG. 6A, an LCOS display 505 includes a thin layer of liquid crystal 509 on a silicon substrate 511 which is covered by a glass window 515. Substrate 511 includes an integrated circuit 520 with pixels Hj. Integrated circuit 520 is used to apply an electric field across the liquid crystal layer 509 in order to reorient the liquid crystal and thereby modulate a light beam that is reflected from substrate 511 as shown in FIG. 5 or in special processes, transmitted through substrate 511.

At this point, it should be noted that it is advantageous to update all pixels simultaneously in situations such as in drive schemes which utilize an electrical modulation of the cover glass transparent electrode voltage which can facilitate dc balancing. Changes in the electrical data presented to the pixel electrodes can be synchronized with changes to the color glass voltage, thereby maximizing the efficiency of the drive scheme. It is advantageous if integrated circuit 520 uses an area which is comparable with, or less than that used by existing static pixel designs. Standard 1.2 micrometer CMOS design can be used as it has for existing static pixel designs to yield an approximately 20 micrometer by 20 micrometer pixel area.

FIG. 6B shows a close-up view of a group of three pixels Hj such as the three pixels 521 as well as some of the associated electronics according to one embodiment of the invention. Note that FIG. 6B is only a schematic representation of several pixels together with their associated electronics. In particular, a series of pixel buffers 525 are respectively coupled to liquid crystal driving electrodes 529 of pixels Hj to integrated electronics 520. The entire group of pixel buffers 525 comprise an image buffer 535. A data input 538 receives image data to be eventually displayed.

Display 505 operates as follows. New image data would be received via input 538 by integrated circuit 520 and stored in frame buffer 535 but not yet applied to liquid crystal layer 509. This allows the previous image to be viewed without it being gradually displaced by the new data. Once frame buffer 535 has been completely filled with the new data, that new data is simultaneously transferred from pixel storage elements 526 to liquid crystal driving electrodes 529.

Note that the above scenario makes it possible to significantly reduce the time interval during which the displayed data is changing. For example, consider using a standard LCOS device which has 1024 by 1024 pixels, which addresses and begins to update the pixels a row-at-a-time. For such a standard system which includes 32 data wires running at 50 Mbits/second, the displayed data is updated in about 655 microseconds. However, display system 505 which replaces the old image data with the new image data, is limited to the switching time of the pixels and in particular, of the liquid crystal device, which is about 100 microseconds. Note that pixels Hj are not necessarily static and indeed at this point a dynamic type pixel approach might be preferable.

The discussion that follows deals with examples of the system shown in FIGS. 6A and 6B (but the circuits are not limited to such a display), and elements shown in those figures will have the reference numeral from FIGS. 6A and 6B in parenthesis. The discussion applies equally to display devices and/or spatial light modulators. That is, all pixel mirrors or pixel electrodes should be considered as elements for driving display devices such as liquid crystal displays, electro-luminescent displays, deformable mirror displays, or as driving elements of spatial light modulators, or for any other pixel type display.

Figure 7A:
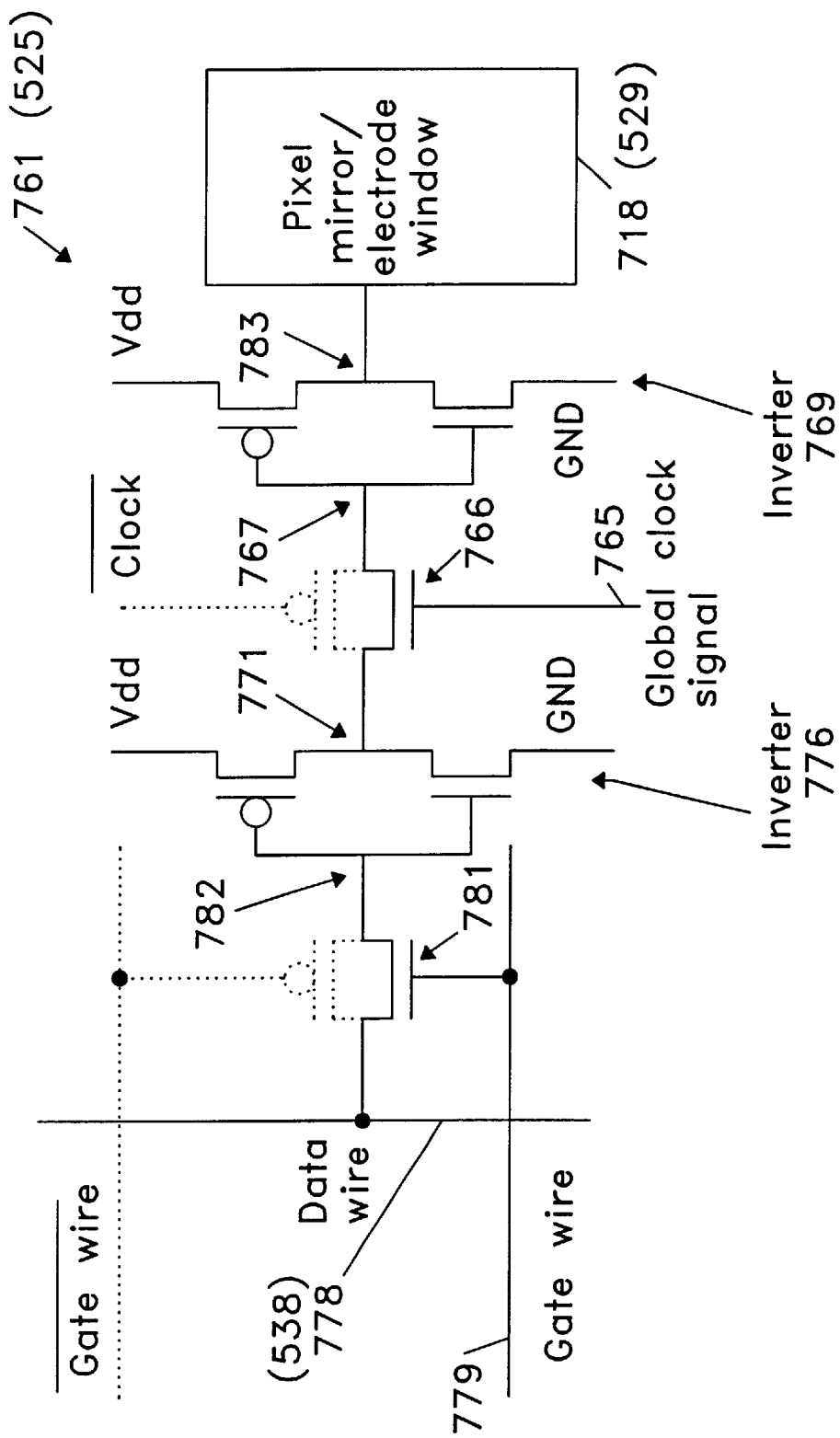
FIG. 7A shows a first embodiment of a frame-buffer style of pixel display which uses a CMOS version of a double inverter circuit (corresponding to the buffer circuit in FIG. 6B) for signal storage and regeneration.

FIG. 7A shows a first embodiment of a frame-buffer style of pixel display which uses a CMOS version of a double inventor circuit 761 (corresponding to buffer circuit 525 in FIG. 6B) for signal storage and regeneration. This version is binary, because it uses inverters that can only reasonably be expected to drive to 0 V or Vdd (often 5V). It is also a dynamic pixel system, because it requires a periodic refresh to maintain data which is capacitively stored. Note that FIG. 7A includes dashed lines which represent an alternative version of double inverter circuit 761, which will be discussed with reference to FIG. 7B. The dashed lines are not considered part of circuit 761 in FIG. 7A, but are included for reference purposes.

Referring first to FIG. 7A, double inverter circuit 761 operates as follows. A global clock (not shown) provides a global clock signal on line 765 to a transistor 766. When the global clock signal on line 765 is inactive, it isolates input 767 of inverter 769 from output 771 of inverter 776. A frame of new data on data wires 778 (note that data wire 778 corresponds to line 538 in FIG. 6B and also note that there is only one wire 778 per pixel circuit 761 which is why only one is shown in FIG. 7A and hence only a pixel datum would be present on each such wire 778) is loaded into inverters 776 via transistor 781 and input 782 of inverter 776 of the pixel displaying a row-at-a-time scheme similar to that discussed in FIGS. 1B and 1C. A single gate wire 779 is activated which sets a row of inverters 776 to the new data value. When gate wires 779 are deactivated, the data is stored on the input capacitance of input 782 of inverter 776.

Rows of pixels are sequentially addressed in the above manner until all the pixels of the display have new data on their inverters 776. The global clock is then activated, causing transistor 766 to allow the transfer of data from output 771 of inverter 776 to input 767 of inverter 769. This, in turn, transfers the data to output 783 of inverter 769 which is connected to pixel electrode 718 (which corresponds to electrodes 529 in FIG. 6B). Then, the global clock signal on line 765 is deactivated and the pixel datum is safely stored on input 767 of inverter 769. A next frame of data is loaded onto inverters 776 via data wires 778 and transistors 781.

Pixel mirror/electrode mirror 718 supplies liquid crystal (not shown) of the display with charge throughout the switching process of the liquid crystal at each pixel. This is advantageous because it leads to faster switching and more complete switching. This is especially in high spontaneous polarization materials.

It should be noted that circuit 761 uses single transistors 766 and 781 to drive inverters 769 and 776, respectively, and hence there may be a possible threshold drop. Consequently, an alternative embodiment will be presented which uses two more addressing wires and two more transistors to allow the full voltage swing through the pass gates to the inverter inputs. This alternative embodiment is shown in FIG. 7B.

Figure 7B:
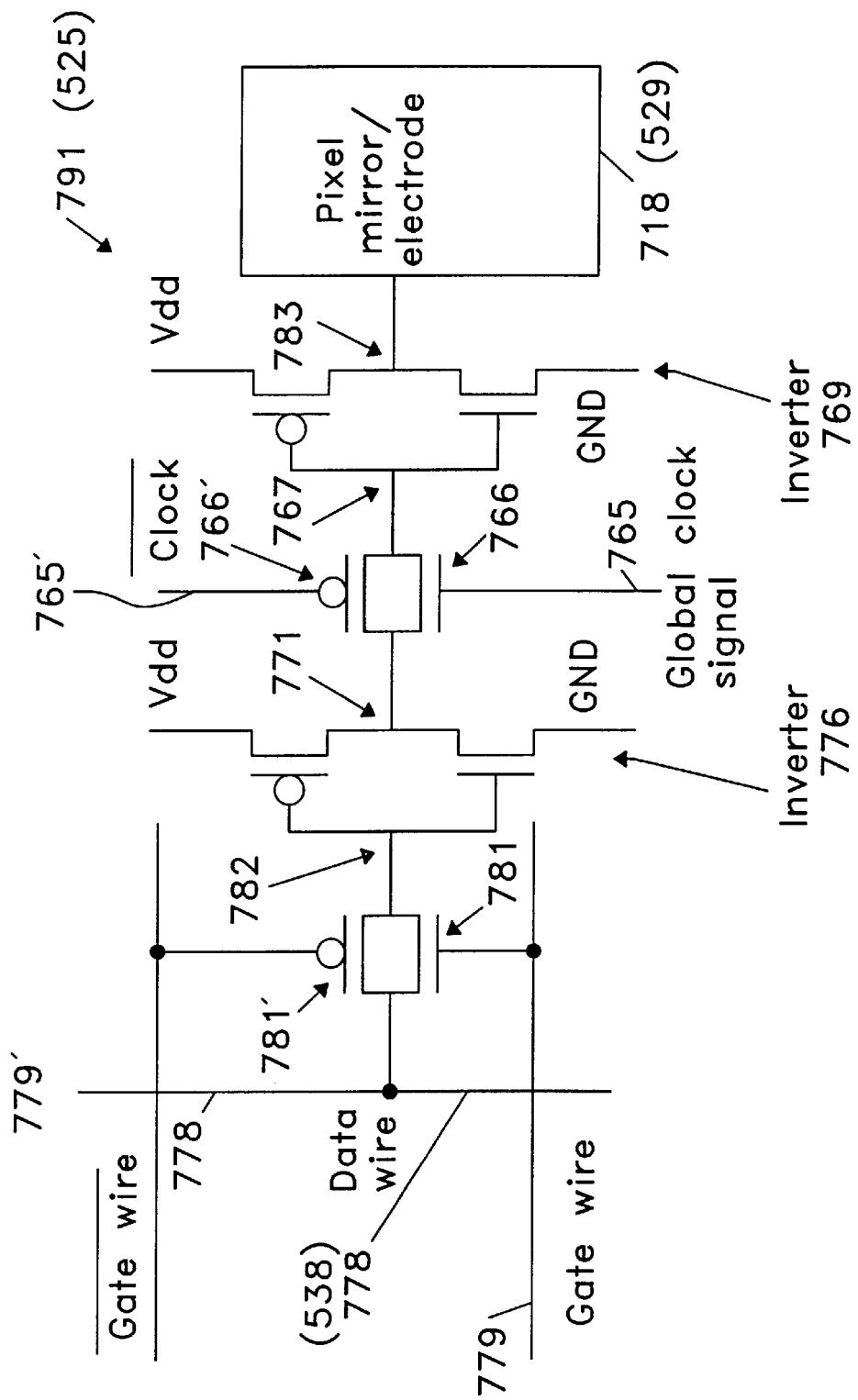
FIG. 7B shows a second embodiment of a frame-buffer style of pixel display which uses a CMOS version of a double inverter circuit with additional transistors for signal storage and regeneration.

FIG. 7B shows a second embodiment of a frame-buffer style of pixel display which uses a CMOS version of a double inverter circuit 791 with additional transistors for signal storage and regeneration. This version is also binary, because it uses inverters that can only reasonably be expected to drive to 0 V or Vdd (often 5V). It too is a dynamic pixel system, because it requires a periodic refresh to maintain data which is capacitively stored.

Referring to FIG. 7B, double inverter circuit 791 operates in a manner similar to FIG. 7A. Namely, a global clock (not shown) provides a global clock signal on line 765 to transistor 766. A second inverted transistor 766', however, receives a logically reversed global clock signal on line 765' (i.e., the logical inverse of the clock signal on line 765). When the global clock signal on lines 765 and 765' are inactive, they isolate input 767 of inverter 769 from output 771 of inverter 776. A frame of new data on data wire 778 is loaded into inverters 776 via transistors 781 and 781' in accordance with gate wires 779 and 779', respectively. Input 782 of inverter 776 of the pixel circuit display a row-at-a-time scheme. Gate wires 779 and 779' are activated which sets a row of inverters 776 to the new data value. When gate wires 779 and 779' are deactivated, the data is stored on the input capacitance of input 782 of inverter 776.

Pixels are sequentially addressed by rows in the above manner until all the pixels of the display have new data on their inverters 776. The global clock is then activated, causing transistors 766 and 766' to allow the transfer of data from output 771 of inverter 776 to input 767 of inverter 769. This in turn, transfers the data to output 783 of inverter 769 which is connected to pixel electrode 718. Then, the global clock signal on line 765 and the inverse clock signal on line 765' is deactivated and the pixel datum is safely stored on input 767 of inverter 764. A next frame of data is loaded onto inverters 776 via data wires 778 and transistors 781 and 781'.

The above embodiment shown in FIG. 7B has the advantage of avoiding possible threshold drop, but requires more area per pixel than that of FIG. 7A. The next embodiment shown in FIG. 8 is even more compact than the embodiment of FIG. 7A.

Figure 8:
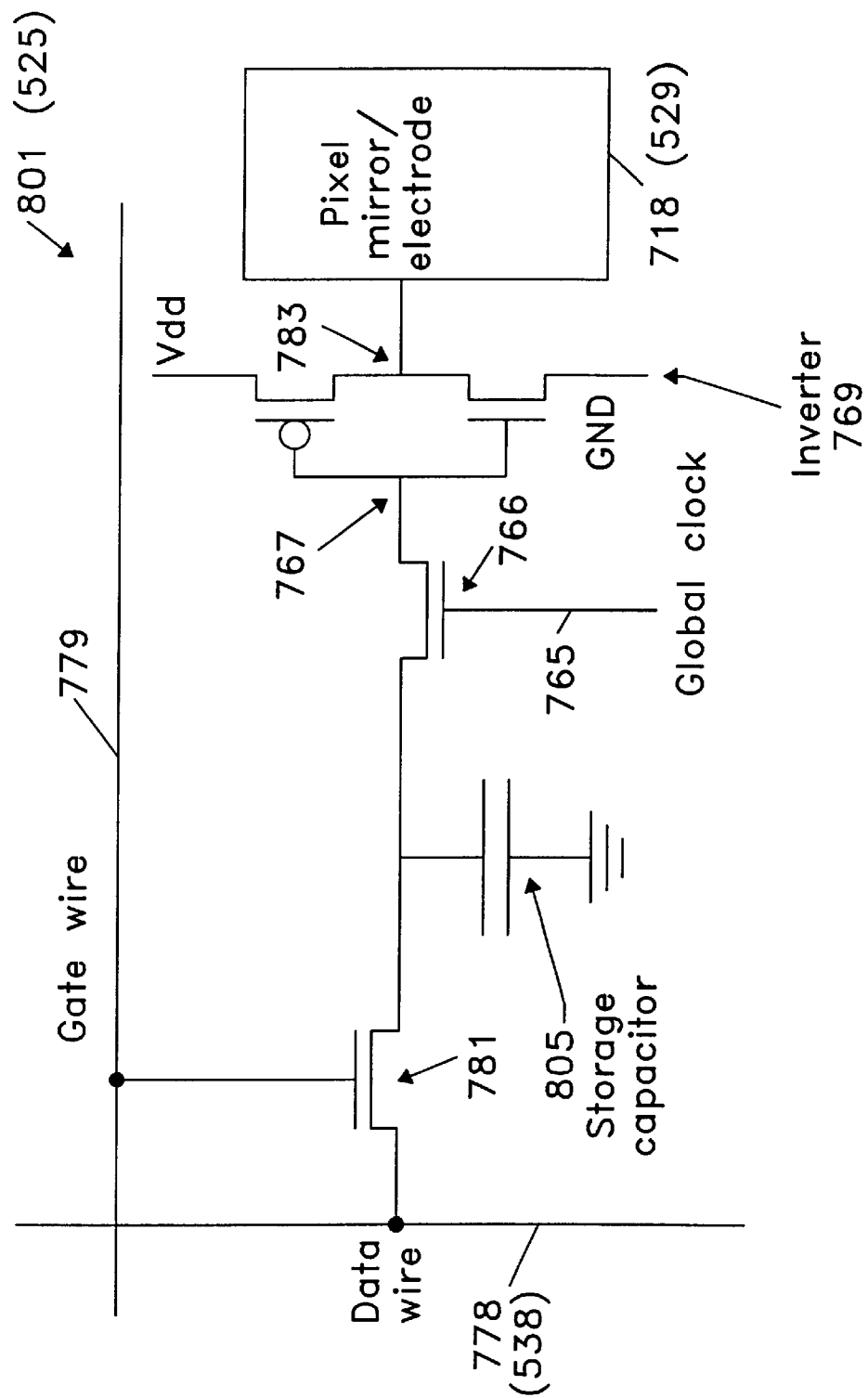
FIG. 8 shows another embodiment of a frame-buffer style of pixel display which uses a single inverter.

FIG. 8 shows a single inverter pixel circuit 801. Pixel mirror/electrode 718, inverter 769, gate wire 779, and other elements are given the same reference numbers as those provided in FIGS. 7A and 7B where possible. Note that inverter 776 in those figures has been replaced by a capacitor 805 which stores data while the array is being addressed. This is the same approach as that described above with respect to FIGS. 7A and 7B. However, circuit 801 does not have a buffer to drive input 767 of inverter 769. Consequently, capacitor 805 should be as large as possible. The only disadvantages in making capacitor 805 as large as possible is the area on the chip it uses. Capacitor 805 does not slow down the operation of circuit 801, because, typically the capacitance of data wire 778 is so large relatively speaking as to render the capacitance of capacitor 805 (the pixel capacitance) insignificant from the point of view of drive load. The capacitance of capacitor 805 depend on a variety of parameters of circuit 801 such as the desired frequency of frame-write (or refresh) operations, the rate of charge leakage from pixel capacitor 805 (e.g., possible optically induced leakage), the threshold voltages of the transistors in circuit 801, and the amount of area for each pixel that can be devoted to capacitor 805.

Referring to FIG. 8, circuit 801 operates in a manner analogous to the double inverter circuits 761 and 791 as will be explained. As above, global clock (not shown) provides a global clock signal on line 765 to a transistor 766. When the global clock signal on line 765 is inactive, it isolates input 767 of inverter 769 from output 783 of inverter 769. A frame of new data on data wires 778 is stored on capacitors 805 via transistors 781 of the pixel in a row-at-a-time scheme similar to that discussed above. Single gate wire 779 is activated which charges a row of capacitors 805 to the new data value.

Rows of pixels are sequentially addressed in the above manner until all the pixels of the display have new data stored on their capacitors 805. The global clock is then activated, causing transistors 766 to allow the transfer of voltage and hence an entire frame of data is transferred from capacitor 805 to input 767 of inverter 769. This in turn, transfers the data to output 783 of inverter 769 which is connected to pixel electrode 718 a frame at a time. Then, the global clock signal on line 765 is deactivated and the pixel data is safely stored on input 767 of inverters 769 while the next frame of data charges capacitors 805 via data wires 778 and transistors 781. The data which appears at pixel mirror 718 is of the opposite polarity from the data on data wires 778.

The above discussed circuits wire pixel circuit designs which drive the pixel electrodes 718 to binary values. The discussion that follows deals with circuits that drive pixel electrodes 718 to analog voltages.

Figure 9A:
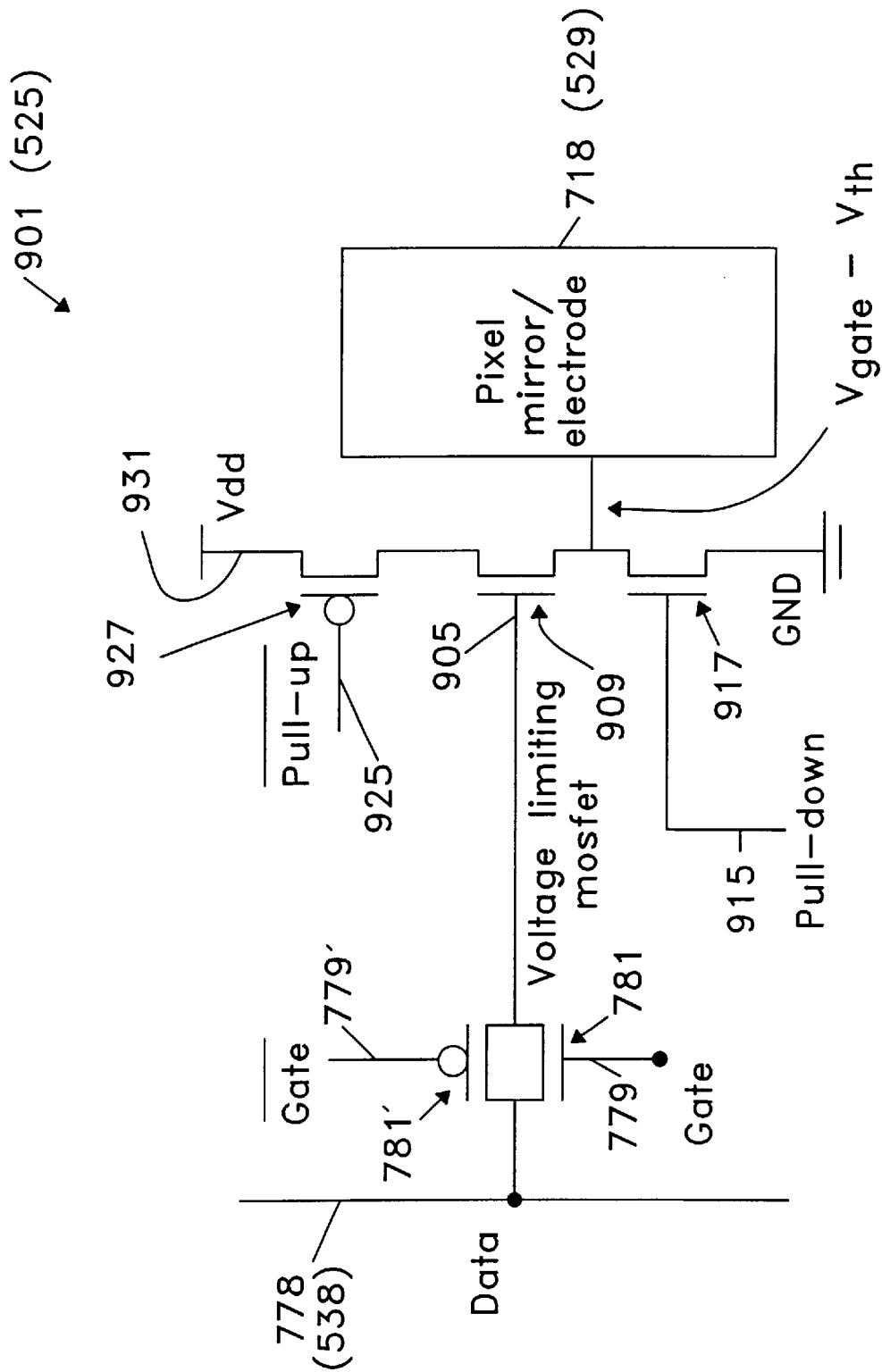
FIG. 9A shows an analog frame-buffer pixel circuit 901 according to another embodiment of the invention.
Figure 9B:
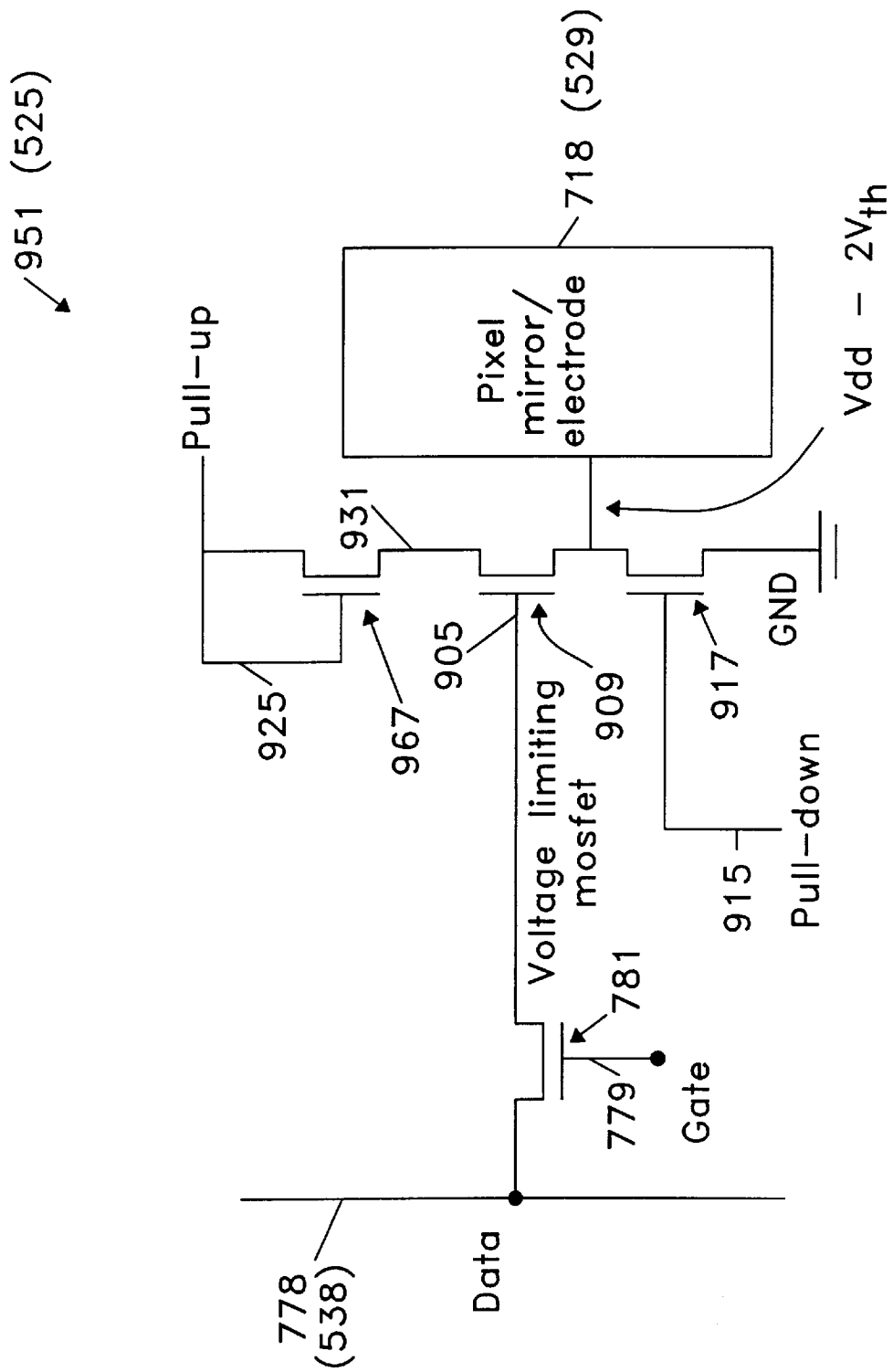
FIG. 9B shows a schematic of an analog frame-buffer pixel circuit 951 that uses only n-FETs and requires one less transistor and two fewer addressing wires per pixel.

FIG. 9A shows an analog frame-buffer pixel circuit 901 according to another embodiment of the invention. Note that the process of integrating subframes is not required for an analog pixel circuit since by definition an analog circuit can output grey-scale type images. However, as previously discussed, if an observer sees three separate grey scale images of red, green and blue in series (rather than simultaneously), he or she will integrate those images together (provided they appear at high enough rates such that the integration occurs. This occurs typically at frame rates beginning at approximately 180 Hz (3 times 60 Hz) in a pattern of RGBRGB . . . which represents changing a liquid crystal color filter from red (R) to green (G) to blue (blue) or rotating a color wheel or sequential activation of Red, Green, and Blue light sources such as light emitting diodes. In any case, the pixel circuits represented in FIGS. 9A and 9B provide the capability of switching frames of analog data an entire frame at a time by capturing an entire frame at a time before displaying that frame. This makes it possible to precisely synchronize switching from an R frame to a G frame to a B frame rather than trying to synchronize the row-by-row updating of the prior art displays or spatial light modulators.

Furthermore, these pixel circuits will facilitate the rapid display of multiple Red, Green, and Blue within the duration of a single image, which can provide a variety of additional benefits. For instance, in the example above, one Red, one Green, and one Blue subframe are used to form a single color image which, in this example, lasts for one sixtieth of a second. It is advantageous to intersperse more subframes into the time allotted for the single color image. For example, six analog subframes could be used (instead of three) within the 1/60 second time period and they could be presented in the order RGBRGB, or nine analog subframes RGBRGBRGB, or twelve analog subframes RGBRGBRGBRGB, ETC . . . . This process can be extended by repeatedly displaying groups of RGB's within the duration of time that a single color image would be displayed to achieve visually smooth motion (i.e. –1/60 second). In this approach, all of the Red subframes could be identical, all the Green subframes could be identical, and all of the Blue subframes could be identical. The above discussion applies to any order of displaying Red, Green, and Blue subframes and they need not be displayed as Red followed by Green followed by Blue.

In this approach, the rates that these subframes are displayed is above that of ordinary display rates. The advantages of interspersing more subframes through the time allotted for a single color image are a reduction in image flicker and a reduction in color breakup effects in moving images. The term "color breakup" refers to a phenomenon in which the human visual system perceives color fringes around the edges of moving objects. It has also been observed that interspersing the Red, Green and Blue is much more effective in reducing image flicker and color breakup as opposed to displaying groups of Red subframes followed by groups of Green subframe and Groups of Blue subframes. Again, the pixel circuits discussed above and below provide hardware capable of achieving such high display rates.

Pixel mirror 718 is driven to the data voltage level through pull-up and pull-down transistors which are clocked as will now be explained. Circuit 901 will be described with the premise that a previous image is already capacitively stored on pixel mirrors 718. Again, rows of the display are sequentially addressed by activating gate lines 779 and 779' (i.e., line 779 goes high and line 779' goes low). Data wires 778 then charge the capacitive input 905 which is the gate of voltage limiting MOSFET 909 to the analog voltage on those data wires 778. This is done for each row of the display.

Pixel mirrors 718 are simultaneously reset (set to zero volts) by a HIGH on global pull-down line 915 by pull-down transistor 917. This global pull-down line 915 can be maintained on HIGH for enough time to switch certain liquid crystal materials if, for example, they have a high spontaneous polarization. Examples of such a liquid crystal material is BDH 764E which requires approximately 30 microseconds to fully switch. As it switches, the reorientation of the molecular electric dipoles partially neutralizes the charge on the pixel electrode. It is advantageous if the pixel electrode charge can be replenished through the time the liquid crystal is switching, so that the charge neutralization does not cause a perturbation of the voltage on the electrode, and a corresponding perturbation of the desired "off" state. Another example of a liquid crystal with a permanent dipole is the chiral smectic distorted helix ferroelectric materials made by Hoffman LaRoche. Its characteristic switching time is approximately 200 microseconds. All of the pixel mirrors 718 are then simultaneously set to their new analog voltages by the activation of pull-up transistors 927, i.e., by setting global pull-up line 925 LOW.

The above happens as follows. Current flows from Vdd line 931 through pull-up transistor 927 which is switched fully "on" and through voltage limiting transistor 909 to pixel mirror 718. It must be noted here that MOSFETS undergo a phenomenon called "pinch-off" which limits the voltage signal which can be passed by an "on" transistor. Hence, the voltage that can be passed is limited to the voltage on gate 905 ($V_{gate}$) minus the threshold voltage ($V_{th}$) of transistors 909. Pixel mirror 718 therefore charges up to $V_{gate}-V_{th}$, thereby allowing the previously set gate voltage to control the voltage pixel mirror 718 charges up to.

In a standard CMOS process, the n-transistor threshold is a positive quantity and so pixel mirror 718 cannot be charged up completely to the supply voltage Vdd.

FIG. 9B shows a schematic of an analog frame-buffer pixel circuit 951 that uses only n-FETs and requires one less transistor and two fewer addressing wires per pixel. Hence, this design is more compact than that shown in FIG. 9A. Using only n-channel transistors removes the need for an n-well at each pixel as well as a power supply rail to clamp the well voltage. However, this design does not have another threshold voltage drop. Again, identical reference numbers are used for those elements of circuit 901 (FIG. 9A) which are common to circuit 951.

Referring to FIG. 9B, pass gate 781 and 781' is replaced with a single gate 781. Also, p-type pull-up transistor 927 has been replaced by an n-type transistor 967. Here, data voltage is transmitted directly to voltage limiting MOSFET 909 through only n-type transistor 781. Hence, the maximum voltage that can be transmitted to gate 905 is $V_{gate}-V_{th}$ where $V_{gate}$ and $V_{th}$ are the same as defined above. This in turn means that the maximum voltage which can be transmitted through voltage limiting transistor 909 is Vdd–2 $V_{th}$. It is possible to arrange for the transistors in circuit 951 to have a low (pehaps a few tenths of a volt) threshold voltage $V_{th}$ by including an extra mask so that selected transistors are processed to have a different (here lower) threshold.

Other more complex implementations of pixel circuits can be made in view of the above discussion. One such complex implementation involves extending any of the previously described circuits to have more than one storage location at each pixel. This can be done by having more than one data wire going to each pixel, and simultaneously clocking data onto more than one storage location under the control of a single gate wire. Alternatively, each pixel can have a single data wire and more than one gate wire to control which storage location the data present on the data wire is clocked onto. The formatting of the input data would determine which approach is preferable.

A multiple storage location pixel also requires a mechanism for determining which storage location is used to control the pixel electrode at a given time. This might require extra transistors and control wires at each pixel, thereby increasing its complexity and physical size. This type of complex pixel may be advantageous for switching rapidly between images such as Red, Green and Blue images as described above or for performing data reformatting such as parallel to serial conversion if data arrives on several wires to the pixel, but is read out in serial.

Figure 10:
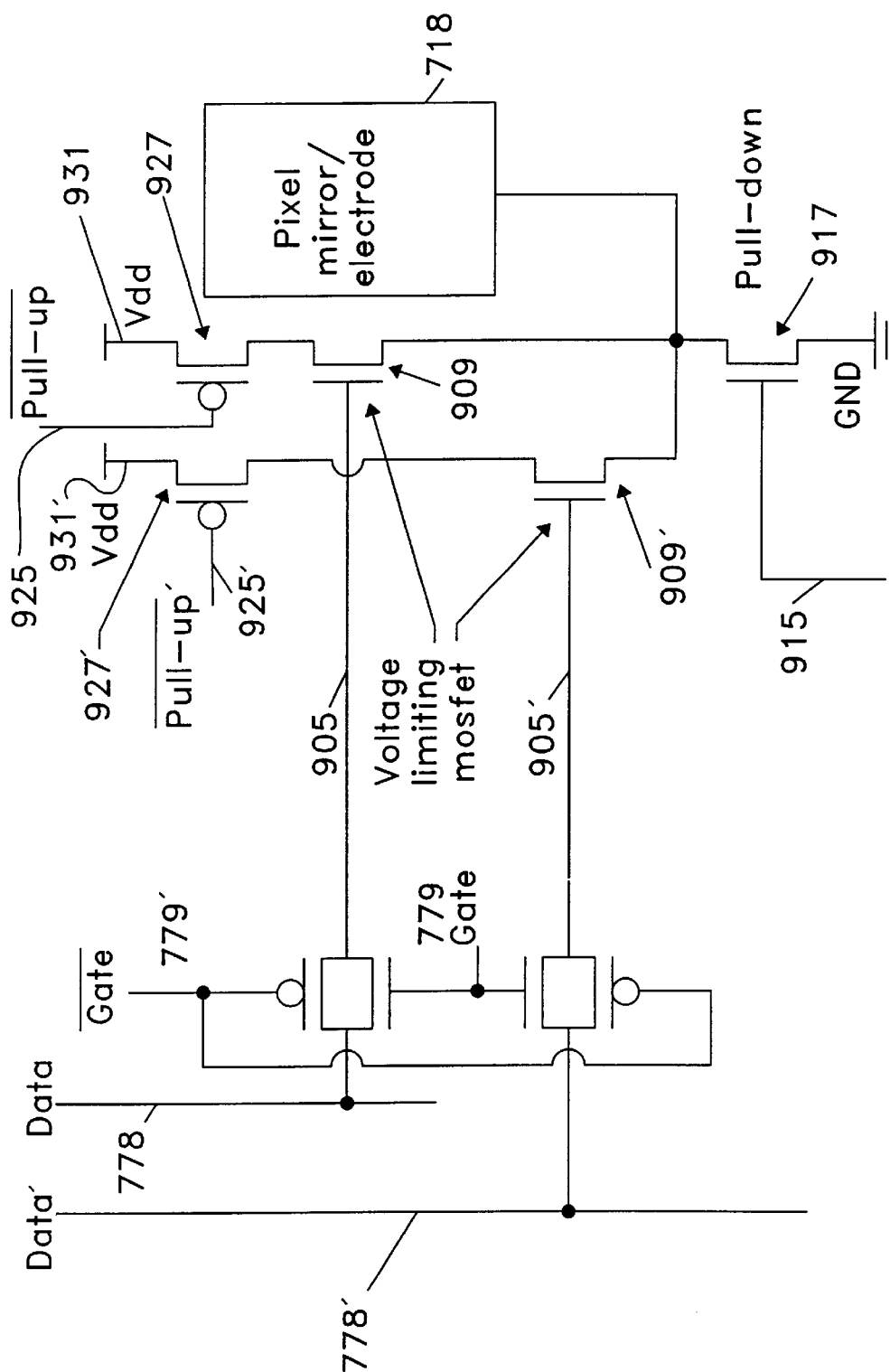
FIG. 10 shows a schematic of a two storage location version of the analog frame buffer pixel shown in FIG. 9A according to another embodiment of the invention.

A schematic of a two storage location version of the analog frame buffer pixel shown in FIG. 9A is shown in FIG. 10. This schematic is a multiple storage location frame buffer pixel with two storage locations and is based on the pixel circuit in FIG. 9A.

The circuit in FIG. 10 operates the same as described for FIG. 9A except that data is simultaneously presented on both data wires 778 and 778', and simultaneously clocked onto the gates of transistors 909 and 909'. Either pull-up transistor 927 or pull-up transistor 927' is activated during the driving sequence, thereby selecting which storage location controls the pixel voltage.

Figure 11:
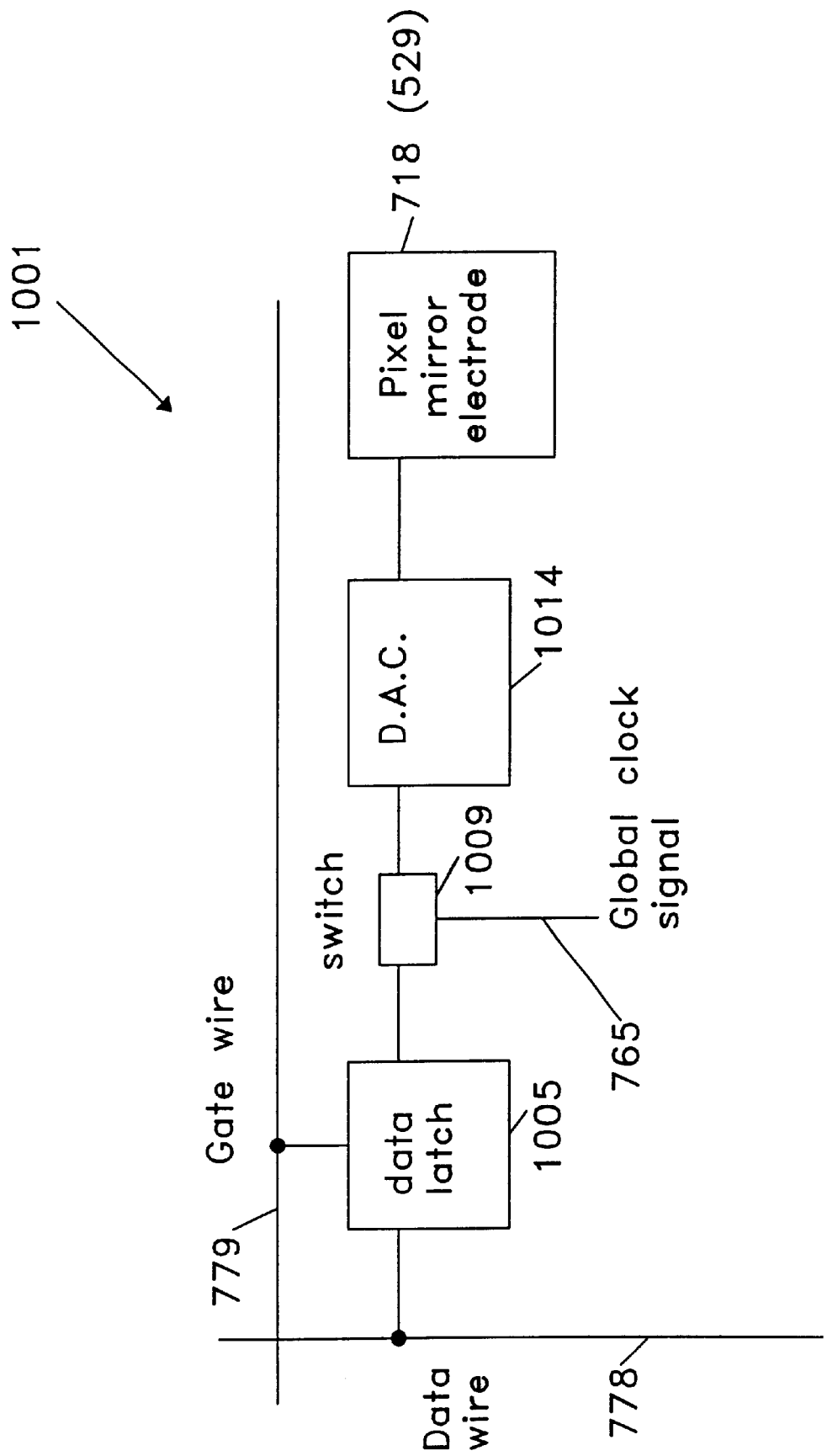
FIG. 11 shows one such more complex pixel circuit according to yet another embodiment of the invention.

FIG. 11 shows one such more complex pixel circuit 1001 according to yet another embodiment of the invention. Here, several bits of digital data can be stored at each pixel and converted locally to an analog signal for driving mirror/electrode 718. Circuit 1001 includes a data latch 1005 which is a n-bit data latch coupled to one or more data wires 778 under the control of gate wire 779. Once the data is loaded onto data latch 1005, switch 1009 is activated with global clock signal 765 and the data bits are simultaneously transferred to the digital-to-analog converter (DAC) 1014 which drives pixel mirror electrode 718 to the desired voltage. This approach could easily be extended to incorporate automatic dc balancing circuitry such as the XOR circuit discussed with respect to the SRAM pixel.

The approach of FIG. 11 requires a larger number of transistors for circuit 1001 than the circuits discussed above. For that reason, it would be unlikely that circuit 1001 would be preferable for most displays, because often it is desirable to put as many pixels as possible in a given area of silicon. However, circuit 1001 and other complex circuits may be advantageous for specialized applications such as optical wavefront correction where it is typically not as important to have a large number of pixels, but instead it is more important to accurately control their optical state.

What is claimed is:

1. A device, comprising:
    a substrate having a first surface;
    a plurality of driving electrodes arranged on said first surface of the substrate; and
    a plurality of circuits arranged on said substrate and respectively coupled to said plurality of driving electrodes for receiving and storing data,
    wherein each of said plurality of circuits comprises:
        a first switching circuit coupled to a gate line, a data line, a first storage section and a second storage section, for receiving the data and simultaneously outputting the data to both the first and second storage sections, said plurality of circuits driving said plurality of driving electrodes synchronous with a switching signal.

2. The device of claim 1, wherein each of said plurality of circuits further comprises a third storage section coupled to the first switching circuit for receiving and storing the data for the respective one of said plurality of driving electrodes, wherein the data is transmitted from a respective one of the first, second and third storage sections to the electrode driver synchronous with the switching signal.

3. The device of claim 1, wherein said data comprises analog image data.

4. The device of claim 1, wherein said analog image data comprises analog color image data.

5. The device of claim 3, wherein said analog image data comprises analog color image data.

6. The device of claim 4, wherein said binary image data comprises binary color image data.

7. The device of claim 2, wherein said data comprises color image data, and each of said first, second and third storage section stores a respective Red datum, Green datum and Blue datum.

8. The device of claim 1, wherein each of said plurality of circuits further comprises:
    a second switching circuit coupled to the switching signal and the first and second storage sections, and
    and electrode driver coupled to the second switching circuit and to the respective one of said plurality of driving electrodes, wherein the data is transmitted from one of the first and second storage sections to the electrode driver synchronous with the switching signals, and which outputs the data to the respective one of said plurality of driving electrodes.

9. The device of claim 8, wherein the first switching circuit includes a first switch and a second switch, both coupled to the gate line and the data line, the first switch outputting the data to the first storage section, and the second switch outputting the data to the second storage section.

10. The device of claim 9, wherein the data line includes a first data wire transmitting a first image datum to the first switch and a second data wire transmitting a second image datum to the second switch.

11. The device of claim 9, wherein the gate line includes:
    a first gate wire coupled to the first switch for controlling the data output to the first storage section, and
    a second gate wire coupled to the second switch for controlling the data output to the second storage section.

12. The device of claim 8, wherein the second switching circuit includes a first switch coupled to the first storage section and the electrode driver, and a second switch coupled to the second storage section and the electrode driver.

13. The device of claim 12, wherein the switching signal includes a first pull-up signal coupled to the first switch, and a second pull-up coupled to the second switch.

14. The device of claim 13, wherein the electrode driver includes:
    a first transistor coupled to the first switch, the first storage section, and the respective one of said plurality of driving electrodes, the first transistor transmitting the data from the first storage section to the respective one of said plurality of driving electrodes synchronous with the first pull-up signal, and
    a second transistor coupled to the second switch, the second storage section and the respective one of said plurality of driving electrodes, the second transistor transmitting the data from the second storage section to the respective one of said plurality of driving electrodes synchronous with the second pull-up signal.

15. The device of claim 14, wherein the first storage section is coupled to a gate of the first voltage limiting transistor, and the second storage section is coupled to a gate of the second voltage limiting transistor.

16. The device of claim 8, wherein the electrode driver comprises:
    a first voltage limiting transistor coupled to the first storage section for transmitting the data from the first storage section to the respective one of said plurality of driving electrodes, and
    a second voltage limiting transistor coupled to the second storage section for transmitting the data from the second storage section to the respective one of said plurality of driving electrodes.

17. The device of claim 8, further comprising a pull-down switch coupled to a global pull-down signal and the respective one of the plurality of driving electrodes, wherein the driving electrodes are reset synchronous with the global pull-down signal.

18. The device of claim 8, wherein the second switching circuit determines which of the first and second storage section controls the data transmitted to the electrode driver.

19. A device comprising:

a substrate having a first surface;

a plurality of driving electrodes arranged on said first surface of the substrate; and a plurality of circuits arranged on said substrate and respectively coupled to said plurality of driving electrodes for receiving and storing data, wherein each of said plurality of circuits comprises:

a first switch coupled to a gate signal and a first data line for receiving a first pixel datum of the data, and outputting the first pixel datum in accordance with the gate signal, a second switch coupled to the gate signal and a second data line for receiving a second pixel datum of the data, and outputting the second pixel datum in accordance with the gate signal, a first storage section coupled to the first switch for receiving and storing the first pixel datum, a second storage section coupled to the second switch for receiving and storing the second pixel datum, a switching circuit coupled to a switching signal and the first and second storage sections, and an electrode driver coupled to the switching circuit and to the respective one of the plurality of driving electrodes, wherein the first pixel datum is transmitting from the first storage section to the electrode driver synchronous with the switching signal, and the second pixel datum is transmitted from the second storage section to the electrodes driver synchronous with the switching signal, the electrode driver selectively outputting one of the first and second pixel datum to the respective one of the plurality of driving electrodes.

20. The device of claim 19, wherein the switching circuit includes a third switch coupled to the first storage section and the switching signal, and a fourth switch coupled to the second storage section and the switching signal.

21. The device of claim 20, wherein the electrode driver comprises:

a first transistor coupled to the third switch, the first storage section, and the respective one of said plurality of driving electrodes, the first transistor transmitting the first pixel datum from the first storage section to the respective one of said plurality of driving electrodes synchronous with the switching signal, and a second transistor coupled to the fourth switch, the second storage section and the respective one of said plurality of driving electrodes, the second transistor transmitting the second pixel datum from the first storage section to the respective one of said plurality of driving electrodes synchronous with the switching signal.

22. The device of claim 21, wherein the switching signal includes:

a first pull-up signal coupled to the third switch for controlling the transmission of the first pixel datum from the first storage section to the electrode driver, and a second pull-up signal coupled to the fourth switch for controlling the transmission of the second pixel datum from the first storage section to the electrode driver.

23. The device of claim 22, further comprising a pull-down switch coupled to a global pull-down signal and the respective one of the plurality of driving electrodes, wherein the driving electrodes are reset synchronous with the global pull-down signal.

* * * * *